(12) United States Patent
Kim et al.

(10) Patent No.: US 11,457,400 B2
(45) Date of Patent: Sep. 27, 2022

(54) METHOD AND DEVICE FOR CONTROLLING RRC STATE MISMATCH ISSUE IN NEXT-GENERATION MOBILE COMMUNICATION SYSTEM

(71) Applicant: Samsung Electronics Co., Ltd., Suwon-si (KR)

(72) Inventors: Sangbum Kim, Suwon-si (KR); Alexander Sayenko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/053,322

(22) PCT Filed: May 9, 2019

(86) PCT No.: PCT/KR2019/005557
§ 371 (c)(1),
(2) Date: Nov. 5, 2020

(87) PCT Pub. No.: WO2019/216663
PCT Pub. Date: Nov. 14, 2019

(65) Prior Publication Data
US 2021/0076308 A1 Mar. 11, 2021

(30) Foreign Application Priority Data
May 9, 2018 (KR) .......................... 10-2018-0053358

(51) Int. Cl.
*H04W 48/12* (2009.01)
*H04W 76/38* (2018.01)
(Continued)

(52) U.S. Cl.
CPC ............ *H04W 48/12* (2013.01); *H04W 8/08* (2013.01); *H04W 48/16* (2013.01); *H04W 76/27* (2018.02); *H04W 76/38* (2018.02)

(58) Field of Classification Search
CPC ..... H04W 48/12; H04W 76/38; H04W 76/27; H04W 8/08; H04W 48/16; H04W 60/02;
(Continued)

(56) References Cited

U.S. PATENT DOCUMENTS 9,717,024 B2 7/2017 Shirota et al.
10,142,885 B2 11/2018 Jung et al.
(Continued)

FOREIGN PATENT DOCUMENTS

KR 10-2014-0144266 A 12/2014
KR 10-2016-0103080 A 8/2016
(Continued)

OTHER PUBLICATIONS

International Search Report and Written Opinion of the International Searching Authority in connection with International Application No. PCT/KR2019/005557 dated Aug. 7, 2019, 12 pages.
(Continued)

*Primary Examiner* — Diane D Mizrahi

(57) ABSTRACT

The present disclosure relates to a communication technique for converging IoT technology with a 5G communication system for supporting a higher data transmission rate beyond a 4G system, and a system therefor. The present disclosure may be applied to an intelligent service (for example, a smart home, a smart building, a smart city, a smart car or connected car, health care, digital education, retail business, a security and security-related service, etc.) on the basis of 5G communication technology and IoT-related technology. The present disclosure discloses a method and a device for controlling the RRC state mismatch issue of a terminal, and also discloses a method and a device for providing access control configuration information of a terminal.

6 Claims, 16 Drawing Sheets

(51) Int. Cl.
*H04W 76/27* (2018.01)
*H04W 8/08* (2009.01)
*H04W 48/16* (2009.01)

(58) Field of Classification Search
CPC ....... H04W 8/22; H04W 48/02; H04W 76/16; H04W 88/06; H04W 48/08
See application file for complete search history.

(56) References Cited

U.S. PATENT DOCUMENTS

| | | |
|---|---|---|
| 10,524,181 B2 | 12/2019 | Kim et al. |
| 2008/0102840 A1 | 5/2008 | Ahn |
| 2014/0128080 A1 | 5/2014 | Mohan et al. |
| 2018/0027469 A1 | 1/2018 | Fukuta et al. |
| 2018/0368209 A1 | 12/2018 | Zhou |
| 2019/0350035 A1* | 11/2019 | Kim ..................... H04W 76/27 |

FOREIGN PATENT DOCUMENTS

| | | |
|---|---|---|
| KR | 10-2016-0123470 A | 10/2016 |
| KR | 10-2018-0015589 A | 2/2018 |
| WO | 2016/137532 A1 | 9/2016 |
| WO | 2017/004147 A1 | 1/2017 |
| WO | 2017/143887 A1 | 8/2017 |

OTHER PUBLICATIONS

Supplementary European Search Report dated May 10, 2021, in connection with a counterpart European patent application No. 19799795.0, 9 pages.

\* cited by examiner

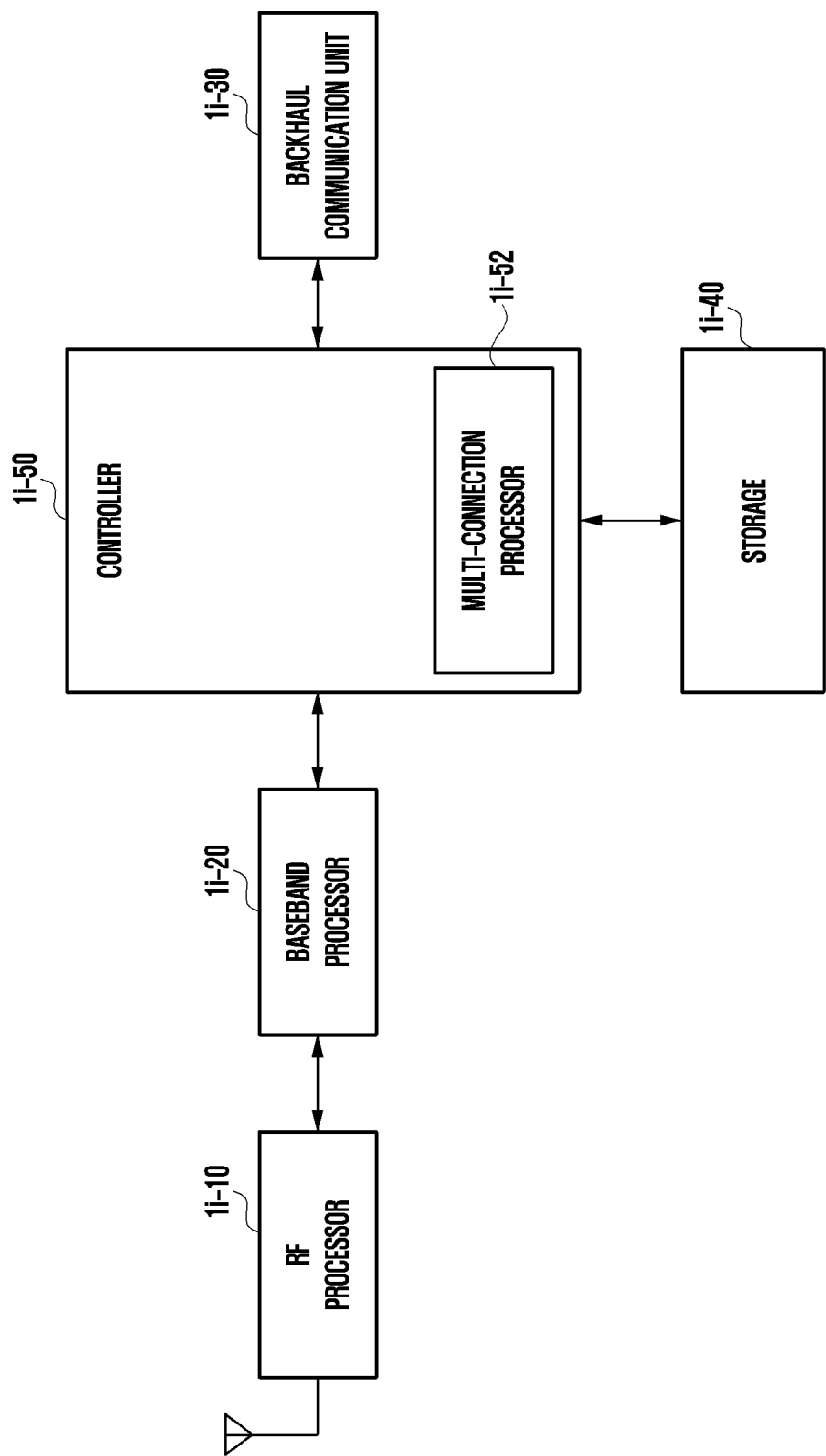

METHOD AND DEVICE FOR CONTROLLING RRC STATE MISMATCH ISSUE IN NEXT-GENERATION MOBILE COMMUNICATION SYSTEM

CROSS-REFERENCE TO RELATED APPLICATIONS

This application is a 371 National Stage of International Application No. PCT/KR2019/005557, filed May 9, 2019, which claims priority to Korean Patent Application No. 10-2018-0053358, filed May 9, 2018, the disclosures of which are herein incorporated by reference in their entirety.

BACKGROUND

1. Field

The disclosure relates to a wireless communication system and, more particularly, to a method and device for controlling a mismatch (or discrepancy) in radio resource control (RRC) state which may occur in a next generation communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Due to various situations that may happen in a next generation communication system, mismatching or discrepancy in RRC state of a UE may occur. Accordingly, a demand for a method of controlling the mismatch problem is increasing.

SUMMARY

Therefore, the disclosure has been made in view of the above-mentioned problems, and an aspect of the disclosure is to improve a communication environment between a user equipment (UE) and a base station (BS) by overcoming a mismatch in radio access state which may occur between the UE and the BS.

Another aspect of the disclosure is to provide a stable communication environment between a BS and a UE by controlling connection (access) of the UE.

In accordance with an aspect of the disclosure, a method of overcoming the above-mentioned problem by a user equipment (UE) may include: identifying a network to access via a base station (BS); receiving a first system information block (SIB) including first information for access control, from the BS if the network is a first network; receiving a second SIB including second information for access control, from the BS if the network is a second network; and performing access control based on the first information included in the first SIB if the network is the first network; and performing access control based on the second information included in the second SIB if the network is the second network.

In accordance with another aspect of the disclosure, a method of overcoming the above-mentioned problem by a BS may include: transmitting, to a UE, a first SIB including first information for access control; and transmitting, to the UE, a second SIB including second information for access control, wherein if the network to which the UE is to access is a first network, access control is performed using the first information included in the first SIB, and if the network to which the UE is to access is a second network, access control is performed using the second information included in the second SIB.

In accordance with another aspect of the disclosure, a UE for overcoming the above-mentioned problem according to an embodiment may include: a transceiver configured to transmit and receive a signal; and a controller configured to: identify a network to access via a BS; receive a first SIB including first information for access control from the BS if the network is a first network; receive a second SIB including second information for access control from the BS if the network is a second network; perform access control based on the first information included in the first SIB if the network is the first network; and perform access control based on the second information included in the second SIB if the network is the second network.

In accordance with another aspect of the disclosure, a BS for overcoming the above-mentioned problem according to an embodiment may include: a transceiver configured to transmit and receive a signal; and a controller configured to transmit a first SIB including first information for access control to a UE, and configured to transmit a second SIB including second information for access control to the UE, wherein, if a network to which the UE is to access is a first network, access control is performed using the first information included in the first SIB, and if a network to which the UE is to access is a second network, access control is performed using the second information included in the second SIB.

According to an embodiment of the disclosure, a mismatch (discrepancy) in RRC state between a user equipment (UE) and a base station (BS) is overcome, and thus the UE and the BS can efficiently communicate with each other.

According to another embodiment of the disclosure, a network access process of a UE is enhanced, and thus a stable communication environment can be provided between the UE and a network.

BRIEF DESCRIPTION OF THE DRAWINGS

FIG. 1I is a block diagram illustrating the configuration of a BS according to an embodiment of the disclosure;

DETAILED DESCRIPTION

Figure 1A:
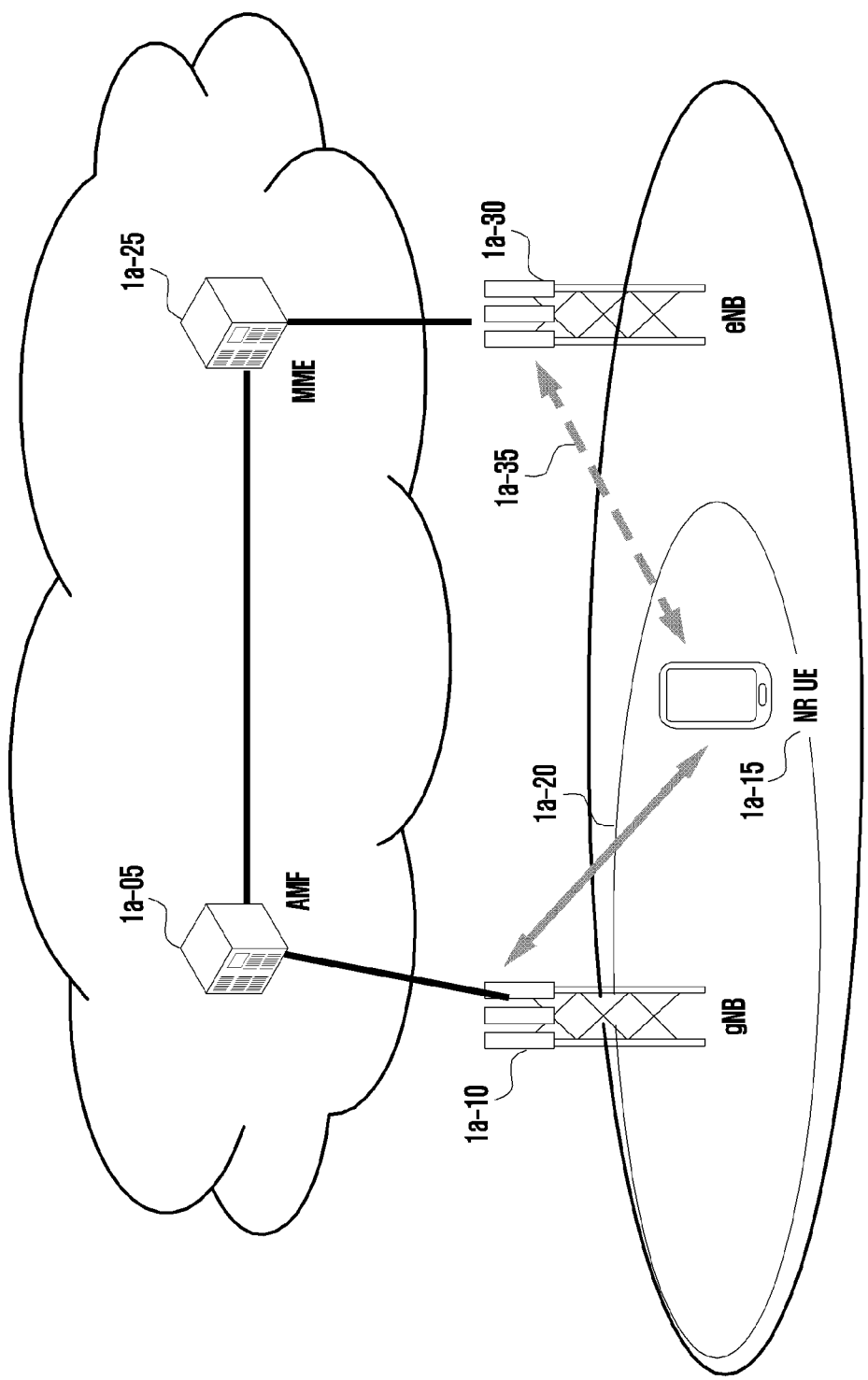
FIG. 1A is a diagram illustrating the structure of a next generation mobile communication system.

Hereinafter, embodiments of the disclosure will be described in detail with reference to the accompanying drawings. It should be noted that, in the drawings, the same or like elements are designated by the same or like reference signs as much as possible. Further, a detailed description of known functions or configurations that may make the subject matter of the disclosure unclear will be omitted.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

First Embodiment

FIG. 1A is a diagram illustrating the structure of a next generation mobile communication system.

Referring to FIG. 1A, a radio access network of a next generation mobile communication system (e.g., a new radio (NR)) includes a next generation base station (i.e., a new radio NodeB, hereinafter, a gNB) 1a-10 and an access management function (AMF) 1a-05 (i.e., a new radio core network). A user equipment (i.e., a new radio user equipment (NR UE) (or a UE)) 1a-15 may access an external network via the gNB 1a-10 and the AMF 1a-05.

In FIG. 1A, the gNB may corresponds to an evolved nodeB (eNB) of a legacy LTE system. The gNB is connected to the NR UE via a wireless channel, and may provide a better service than a service provided by a legacy nodeB in operation 1a-20. In the next generation mobile communication system, all user traffic is serviced via a shared channel. Accordingly, a device may be needed that performs scheduling by collecting state information associated with UEs such as a buffer state, an available transmission power state, a channel condition, and the like. The gNB 1a-10 takes charge of the same. One gNB generally controls a plurality of cells. In order to implement ultra-high speed data transmission when compared to the legacy LTE, the NR system may have a bandwidth greater than or equal to the current maximum bandwidth, and may additionally use a beamforming technology by using an orthogonal frequency division multiplexing (OFDM) as a radio access technology. Also, the NR system applies an adaptive modulation & coding (AMC) scheme that determines a modulation scheme and a channel coding rate based on the channel state of a UE. The AMF 1a-05 performs a function of supporting mobility, configuring a bearer, configuring a QoS, and the like. The AMF is a device that is in charge of various control functions, in addition to a mobility management function associated with a UE, and may be connected to a plurality of BSs. In addition, the next generation mobile communication system may interoperate with a legacy LTE system, and an AMF is connected to an MME 1a-25 via a network interface. The MME is connected to an eNB 1a-30 which is a legacy base station. A UE that supports LTE-NR dual connectivity maintains a connection to an eNB, in addition to a connection to a gNB, and may transmit and receive data in operation 1a-35.

Figure 1B:
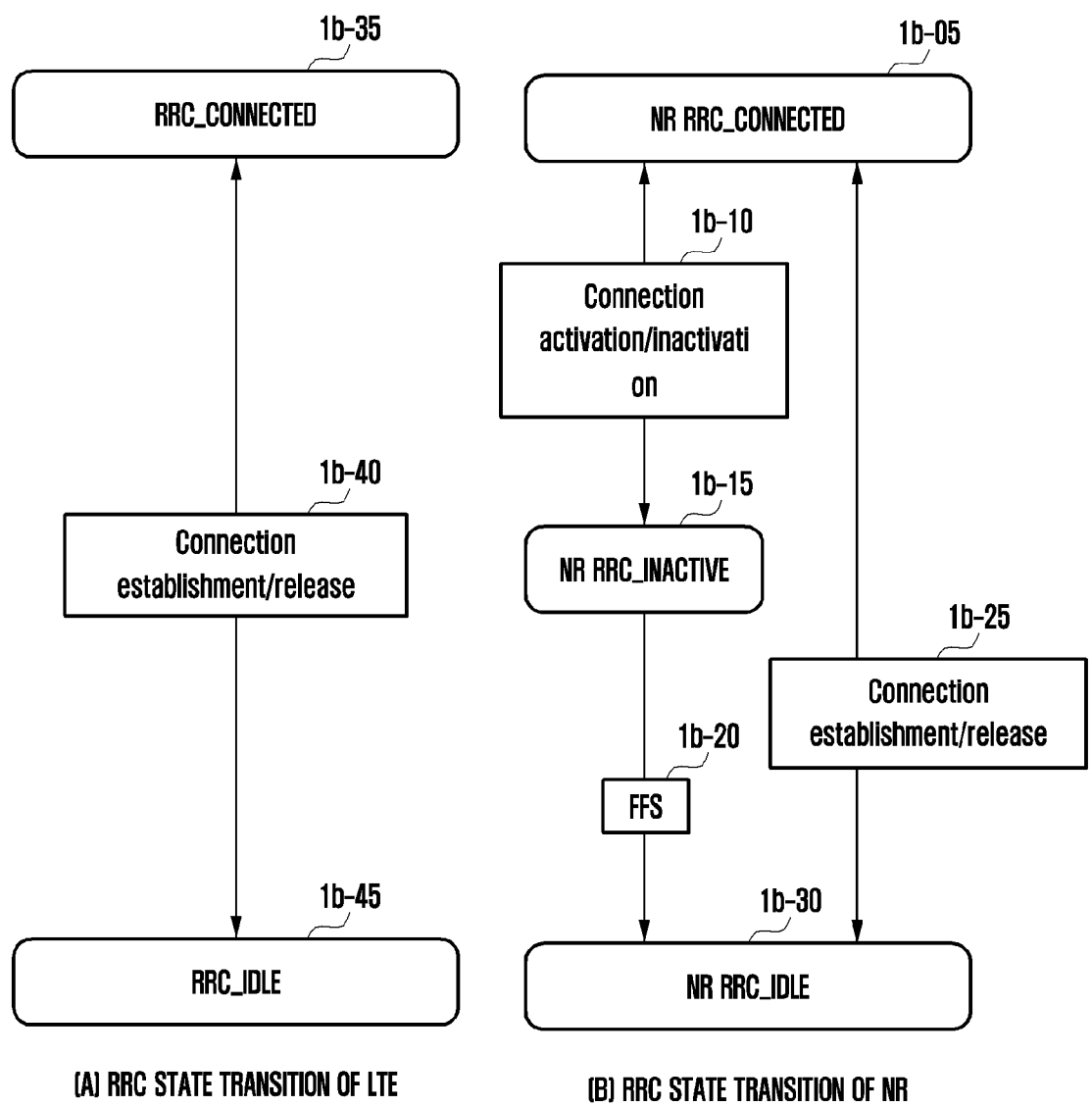
FIG. 1B is a diagram illustrating transition of a radio access state in a next generation mobile communication system.

FIG. 1B is a diagram illustrating transition of a radio access state in a next generation mobile communication system.

In a legacy LTE system, a UE may have two types of radio access states, that is, a connected mode 1b-35 and an idle mode 1b-45. Two modes may be changed via an establishment procedure and a release procedure in operation 1b-40. Conversely, in the next generation mobile communication system, the UE may have three types of radio access states (RRC states). A connected mode (RRC_CONNECTED) 1b-05 is a radio access state in which a UE is capable of performing data transmission and reception with a gNB. An idle mode (RRC_IDLE) 1b-30 is a radio access state in which a UE monitors whether paging is transmitted to the UE. The two modes are radio access states that may be also applied to the legacy LTE system, and the detailed description thereof is the same as that of the legacy LTE system. In the next generation mobile communication system, an inactive mode (RRC_INACTIVE) radio access state 1b-15 is newly defined. In the radio access state, UE context is maintained in a gNB and a UE, and RAN-based paging is supported. The features of the new radio access state are as follows.

Cell re-selection mobility;
CN-NR RAN connection (both C/U-planes) has been established for UE;
The UE AS context is stored in at least one gNB and the UE;
Paging is initiated by NR RAN;
RAN-based notification area is managed by NR RAN;
NR RAN knows the RAN-based notification area which the UE belongs to;

Among the features, an RAN-based notification area is an area configured with one or more cells, and RAN paging with respect to a predetermined UE is transmitted in the area. Therefore, if the RAN area is changed as a UE moves, this may be reported to a gNB. The operation of reporting the same is referred to as "RAN notification area (RNA) update". The operation is performed periodically or when a UE moves to a cell belong to another RAN area. If the operation is performed periodically, the operation is referred to as "periodic RNA update". Since a UE is capable of moving, a cell that triggers the periodic RAN update and a cell that receives a report associated with the same may be different from each other. Therefore, the cell that receives the report may forward the periodic RNA update to the cell that performed triggering. Generally, the cell that performs triggering may have UE context of the UE, and may transfer the UE context to the cell that performed forwarding.

The new INACTIVE radio access state may be changed to a connected mode or an idle mode using a predetermined procedure. A UE may be changed from the INACTIVE mode to the connected mode according to a connection activation procedure, and may be changed from the connected mode to the INACTIVE mode according to a connection inactivation procedure 1b-10. The connection activation/inactivation procedure includes one or more operations of performing transmission and reception of one or more RRC messages between a UE and a gNB. Similarly, the UE may be capable of changing from the INACTIVE mode to the idle mode according to a predetermined procedure 1b-20. As the predetermined procedure, various methods such as a method of exchanging a predetermined message, a timer-based method, an event-based method, and the like, may be considered. Transition between the connected mode and the idle mode may be performed according to the legacy LTE technology. That is, the mode transition may be performed via a connection establishment or release procedure 1b-25.

Figure 1C:
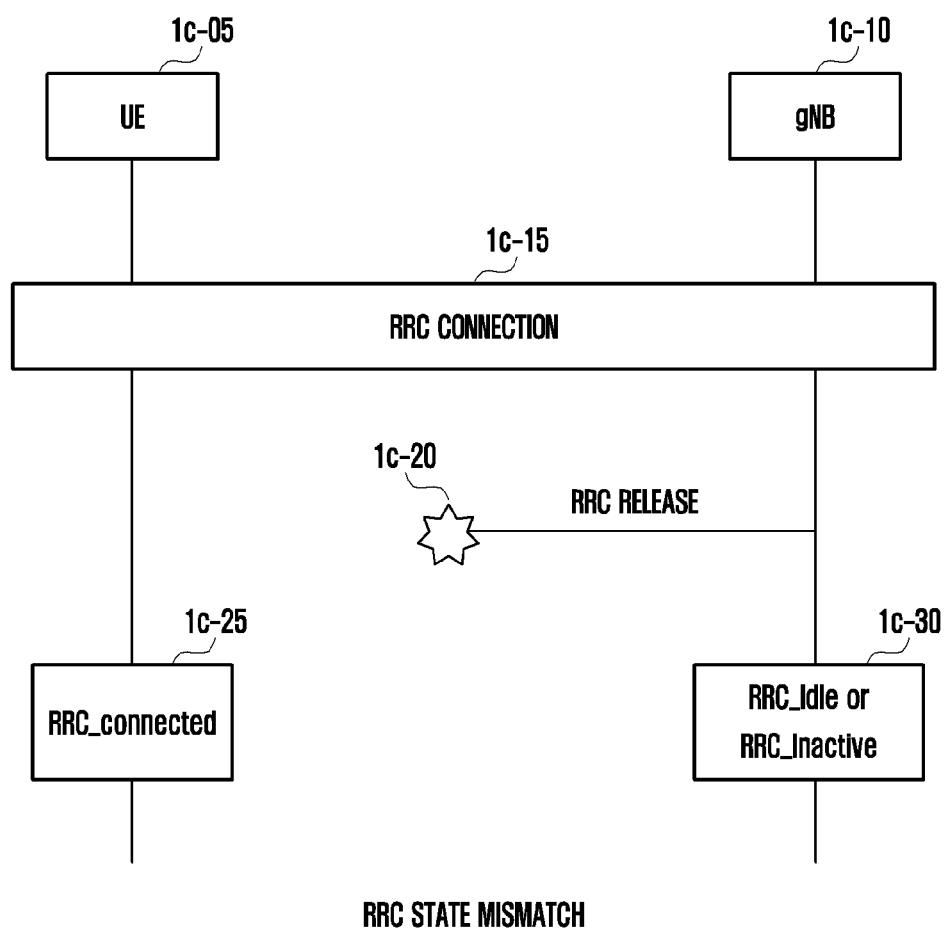
FIG. 1C is a diagram illustrating a mismatch in radio access state in a next generation mobile communication system.

FIG. 1C is a diagram illustrating a mismatch in radio access state in a next generation mobile communication system.

A UE 1c-05 is in the state of being connected to a gNB 1c-10 in operation 1c-15. In the disclosure, the gNB transmits an RRC release message to the UE in order to change the UE to an idle mode (RRC_Idle) or an inactive mode (RRC_Inactive). The message indicates UE's transition to the idle mode or inactive mode, and may include configuration information related thereto. The configuration information may be cell reselection priority information in the idle mode or inactive mode, a periodic RNA update timer value applied in the inactive mode, or the like. However, if a wireless channel has a poor condition, the UE may fail to receive the message in operation 1c-20. The gNB may regard that the UE is immediately changed to the idle mode or inactive mode, irrespective of reception of a HARQ feedback associated with the message in operation 1c-30. However, since the UE does not receive the release message from the gNB, the UE may continuously maintain a connected mode in operation 1c-25. This phenomenon refers to a mismatch in radio access state.

Figure 1D:
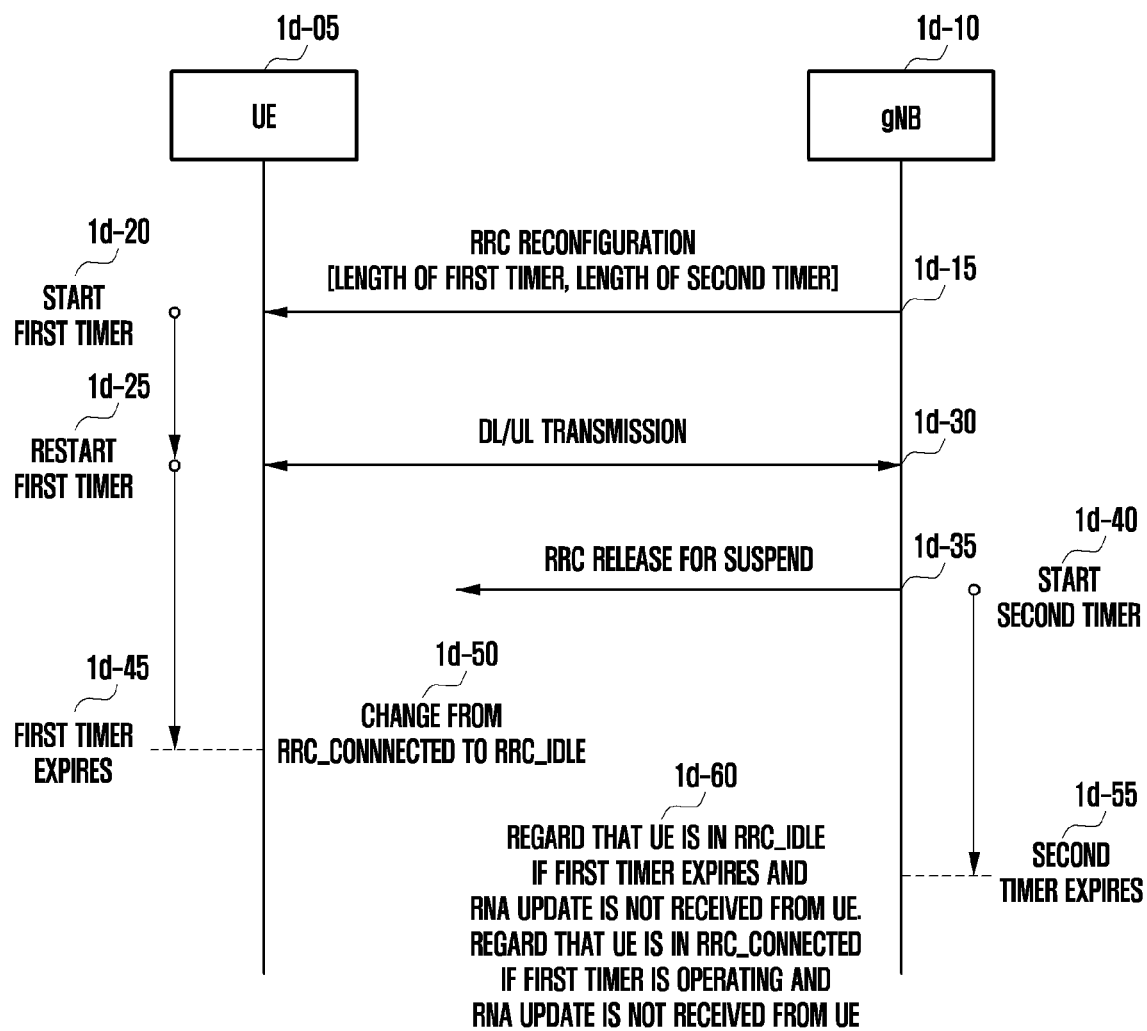
FIG. 1D is a flowchart illustrating a process of overcoming a mismatch in radio access state, according to an embodiment of the disclosure.

FIG. 1D is a flowchart illustrating a process of overcoming a mismatch in radio access state, according to an embodiment of the disclosure.

A UE 1d-05 receives the value of a first timer (e.g., the length of the first timer) and the value of a second timer (e.g., the length of the second timer) via a predetermined RRC message from a gNB 1d-10 in operation 1d-15. The UE may operate the first timer at the point in time at which the timer value is received or at the point in time at which the timer value is received and first data is transmitted or received in operation 1d-20, and may restart the timer in operation 1d-25 every time that the UE transmits or receives data in operation 1d-30. If the first timer expires, the UE may change from the connected mode to the idle mode in operations 1d-45 and 1d-50. The UE and the gNB may operate the second timer at the point in time at which the timer value is received or when the UE changes from the connected mode to the inactive mode, in operation 1d-40. At a predetermined point in time, the gNB transmits, to the UE, a single RRC connection release message that requests RRC connection release, in operation 1d-35. The message indicates transition to the idle mode or inactive mode.

If the connection release message indicates the inactive mode, the gNB operates the second timer in operation 1d-40 when transmitting the message. The message that requests RRC connection release may be used for providing the value of the second timer. The UE that receives the connection release message may also operate the second timer. However, if the UE fails to receive the message, the first timer expires in operation 1d-45 and the UE may be changed to the idle mode in operation 1d-50. If the second timer expires in operation 1d-55, the gNB may expect that "periodic RNA update" of the UE is received from the UE or an adjacent BS. After the second timer expires, the gNB may wait for the periodic RNA update report during a predetermined period of time. If the gNB does not receive the "periodic RNA update" from the UE, the gNB determines that the UE does not receive the connection release message, and may regard that the UE is changed to the idle mode in operation 1d-60. If the first timer is still operating, the gNB regards that the UE is in the connected mode until the timer expires. Therefore, in the disclosure, the "periodic RNA update" reported to the gNB may be used as feedback information for determining whether the UE successfully receives the connection release message indicating the inactive mode. If the "periodic RNA update" is not reported from the UE, the gNB may regard that the UE is in the idle mode. If data is not transmitted or received until a predetermined timer expires, the UE may automatically change to the idle mode.

If the connection release message indicates an idle mode, the gNB may regard that the UE is changed to the idle mode after a predetermined period of time. In this instance, the gNB may not take into consideration whether the second timer operates or not. Therefore, in the disclosure, the gNB may regards that the UE is changed to the idle mode, irrespective of whether the UE successfully receives the connection release message indicating the inactive mode, and the UE also automatically change to the idle mode if data is not transmitted or received until a predetermined timer expires.

In the disclosure, the first timer is referred to as a "data inactivity timer" and the second timer is referred to as a "periodic RNA update timer".

Figure 1E:
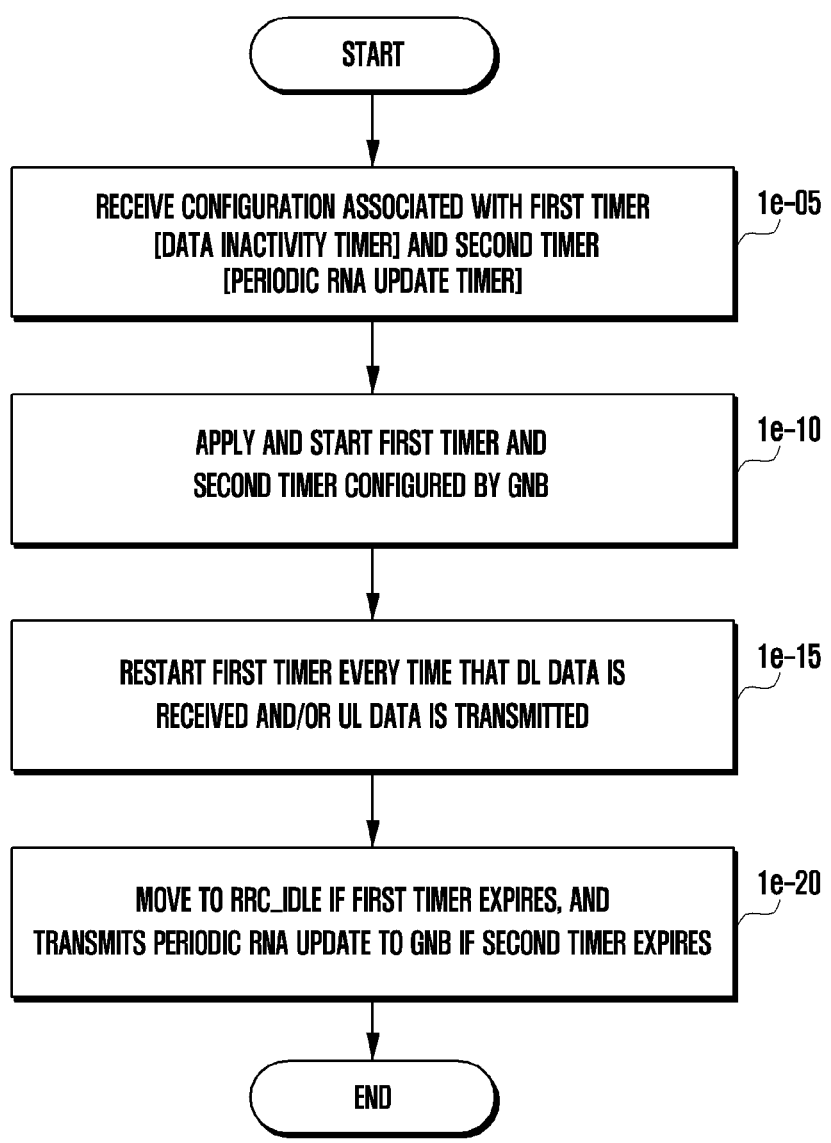
FIG. 1E is a flowchart illustrating operation of a user equipment (UE) according to an embodiment of the disclosure.

FIG. 1E is a flowchart illustrating operation of a UE according to an embodiment of the disclosure.

In operation 1e-05, a UE receives configuration information associated with a first timer and a second timer from a BS. The configuration information may be the time values of the timers.

In operation 1e-10, the UE may operate the first timer at the point in time at which the value of the first timer is received, or at the point in time at which the timer value is received and first data is transmitted or received. The UE may operate the second timer at the point in time at which the value of the second timer is received, or when the UE changes from a connected mode to an inactive mode after receiving the timer.

In operation 1e-15, the UE may restart the first timer every time that the UE transmits or receives data.

In operation 1e-20, the UE may change from the connected mode to the idle mode if the first timer expires. If the second timer expires, the UE may report "periodic RNA update" to a BS that the UE currently camps on (camp-on).

Figure 1F:
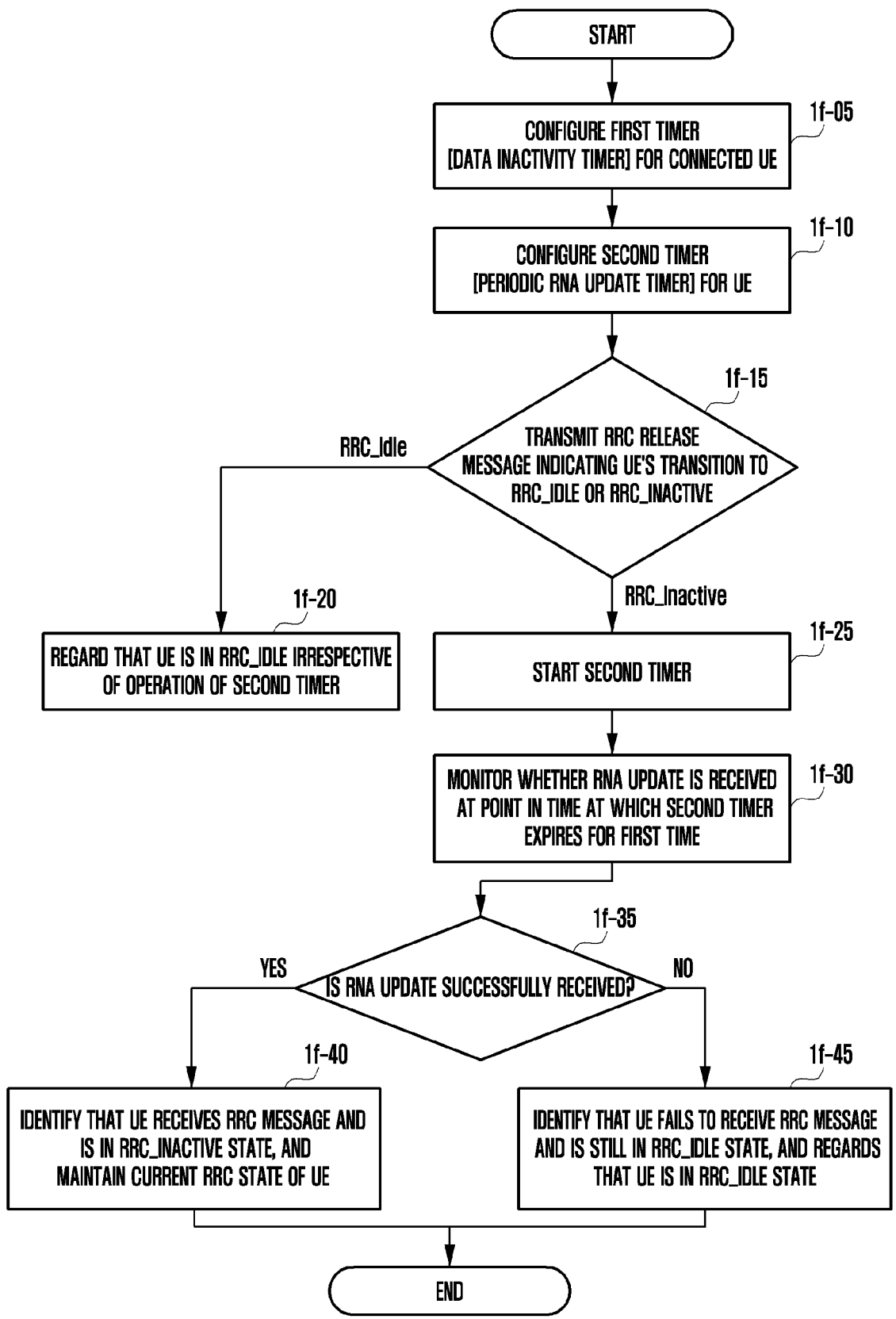
FIG. 1F is a flowchart illustrating operation of a base station (BS) according to an embodiment of the disclosure.

FIG. 1F is a flowchart illustrating operation of a BS according to an embodiment of the disclosure.

In operation 1f-05, a BS configures a first timer for a predetermined UE using a predetermined RRC message.

In operation 1f-10, the BS configures a second timer for the UE using a predetermined RRC message.

In operation 1f-15, the BS indicates the UE's transition to an idle mode or an inactive mode using an RRC connection release message. The BS may include configuration information associated with the second timer in the connection release message.

In operation 1f-20, if the RRC connection release message indicates transition to the idle mode, the BS transmits the message to the UE, and after a predetermined period of time, at least greater than 0 ms, the BS may regard that the UE is changed to the idle mode irrespective of whether the second timer operates.

In operation 1*f*-25, if the RRC connection release message indicates transition to the inactive mode, the BS transmits the message to the UE and operates the second timer. The BS may operate the second timer before the RRC connection release message is received.

In operation 1*f*-30, the BS monitors whether "periodic RNA update" is transmitted from the UE at a periodic RNA update timing that arrives for the first time (or at the point in time at which the second timer expires for the first time) after transmitting the RRC connection release message. After the second timer expires, the BS may monitor the "periodic RNA update" during a predetermined period of time. The BS may receive "periodic RNA update" from another BS.

In operation 1*f*-35, the BS may determine whether the "periodic RNA update" is successfully received.

If the "periodic RNA update" is successfully received, the BS may regard that the UE successfully receives the connection release message and is already in the inactive mode state in operation 1*f*-40.

If the "periodic RNA update" is not successfully received even after the predetermined period of time elapses, the BS may regard that the UE does not successfully receive the connection release message, may determine whether the first timer expires, and may determine that the UE is still in the connected mode or the idle mode in operation 1*f*-45. If the first timer value does not elapse from the point in time at which the last data transmission or reception is successfully performed with the UE, the BS may regard that the UE is still in the connected mode. Since the UE is still in the connected mode, the BS is capable of retransmitting a connection release message to the UE. If retransmission is triggered, the BS that the UE currently camps on may transmit the connection release message to the UE. If the BS does not perform an operation of transmitting the connection release message, the first timer may expire, and thus, the BS automatically regards that the UE is in the idle mode. Otherwise, if the first timer value elapses from the point in time at which the last data transmission or reception is successfully performed with the UE, the BS may regard that the UE is in the idle mode.

Figure 1G:
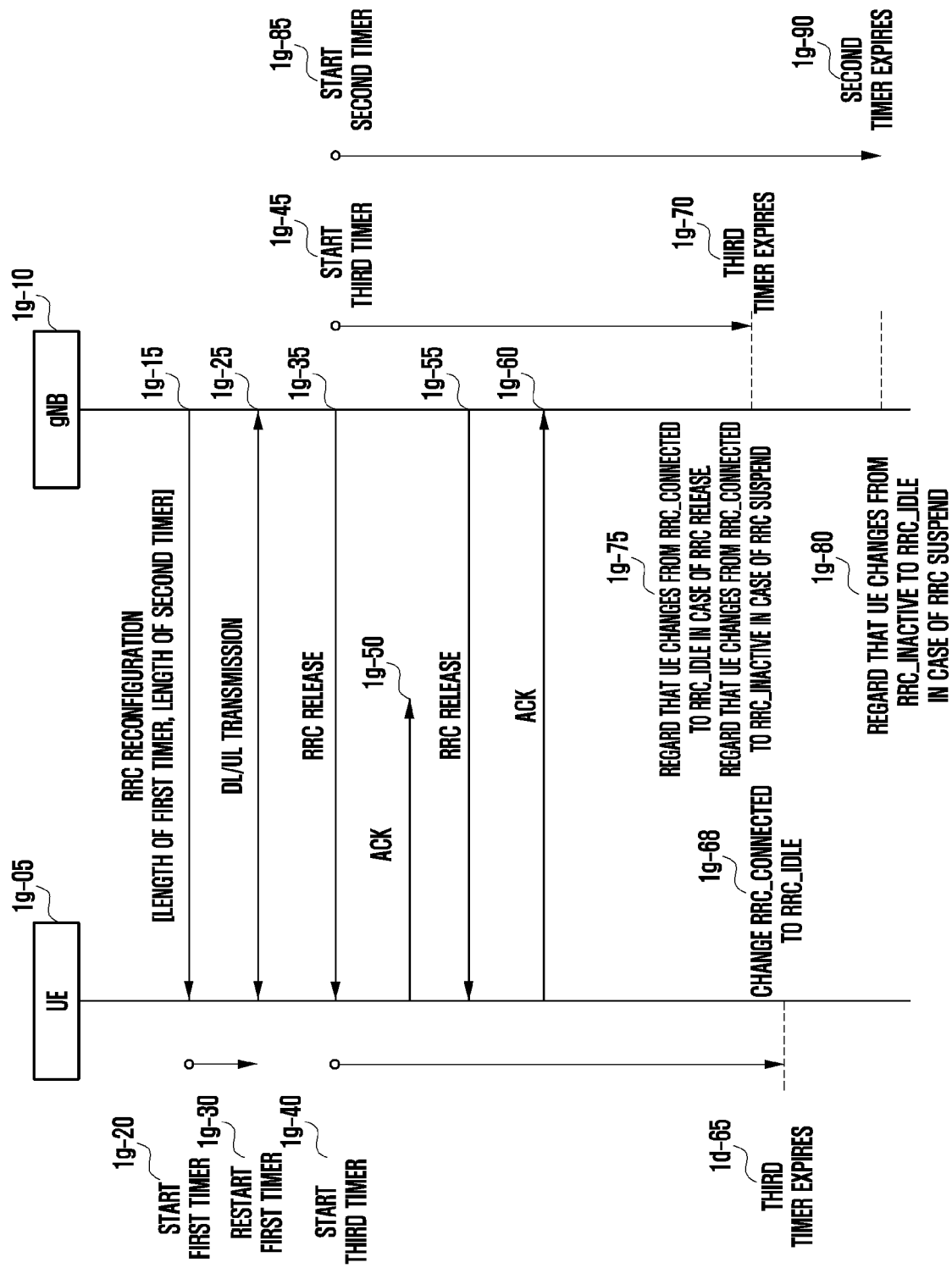
FIG. 1G is a flowchart illustrating a process of transmitting an ACK signal by a UE if the UE receives a connection release message according to an embodiment of the disclosure.

FIG. 1G is a flowchart illustrating a process of transmitting an ACK signal by a UE if the UE receives a connection release message according to an embodiment of the disclosure.

A UE 1*g*-05 may receive the value of a first timer and the value of a second timer via a predetermined RRC message from a BS 1*g*-10, in operation 1*g*-15. The UE may operate the first timer at the point in time at which the timer value is received or at the point in time at which the timer value is received and first data is transmitted or received in operation 1*g*-20, and may restart the first timer in operation 1*g*-30 every time that the UE transmits or receives data in operation 1*g*-25. If the UE successfully receives an RRC connection release message from the BS in operation 1*g*-35, the UE stops the first timer, and operates a third timer in operation 1*g*-40. The value of the third timer may be determined according to a predetermined rule, or may be configured for the UE by the BS via a predetermined RRC message. For example, the value of the timer may be determined to be HARQ_RTT×NUMBER_OF_HARQ_RETX, or may be a previously defined fixed value. Here, HARQ_RTT denotes a round trip time in HARQ, and NUMBER_OF_HARQ_RETX denotes the maximum number of retransmissions in HARQ. Although the UE successfully receives the RRC connection release message, the UE may maintain a connected mode until the third timer expires.

Until the third timer expires, the UE reports an ACK associated with the RRC connection release message to the BS in operation 1*g*-50. If the third timer expires in operation 1*g*-65, the UE stops ACK transmission, and may change to an idle mode or inactive mode indicated by the connection release message in operation 1*g*-68. After first transmission of the RRC connection release message, the BS operates the third timer in operation 1*g*-45. Until the third timer expires, the BS retransmits the connection release message in operation 1*g*-55. If the third timer expires in operation 1*g*-70, the BS regards that the UE is changed to the idle mode or the inactive mode indicated by the RRC connection release message in operation 1*g*-75. If the RRC connection release message indicates the inactive mode, the BS operates the second timer in operation 1*g*-85 when the RRC connection release message is transmitted for the first time. If the second timer expires 1*g*-90 and "periodic RNA update" of the UE is not received from the UE or another BS, the BS may regard that the UE is changed from the inactive mode to the idle mode in operation 1*g*-80.

Figure 1H:
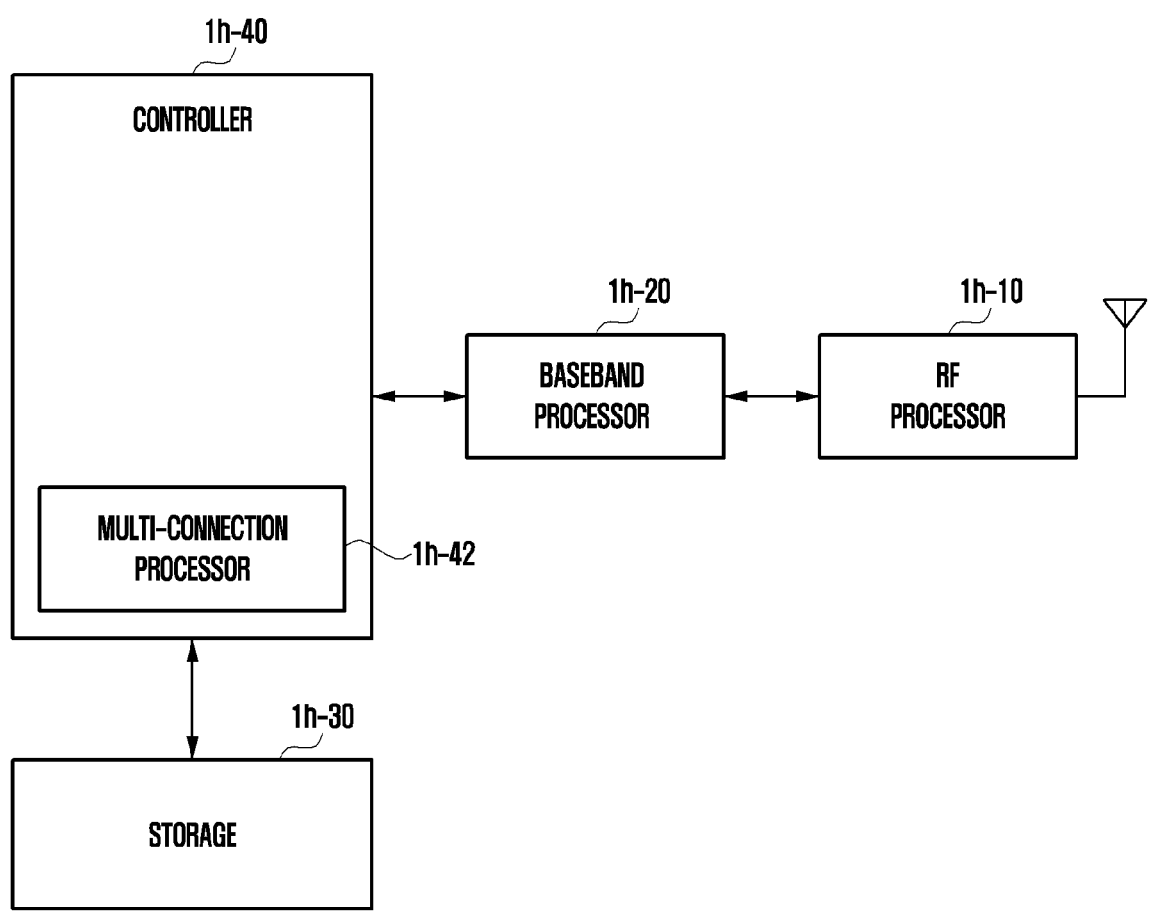
FIG. 1H is a block diagram illustrating the internal structure of a UE according to an embodiment of the disclosure.

FIG. 1H is a diagram illustrating the structure of a UE according to an embodiment of the disclosure.

Referring to the drawing, the UE includes a radio frequency (RF) processor 1*h*-10, a baseband processor 1*h*-20, a storage 1*h*-30, and a controller 1*h*-40.

The RF processor 1*h*-10 performs a function for transmitting or receiving a signal via a wireless channel, such as band conversion and amplification of a signal. That is, the RF processor 1*h*-10 up-converts a baseband signal provided from the baseband processor 1*h*-20 into an RF band signal, transmits the RF band signal via an antenna, and down-converts an RF band signal received via the antenna into a baseband signal. For example, the RF processor 1*h*-10 may include a transmission filter, a reception filter, an amplifier, a mixer, an oscillator, a digital-to-analog converter (DAC), an analog-to-digital Converter (ADC), and the like. Although the drawing illustrates only a single antenna, the UE may include a plurality of antennas. In addition, the RF processor 1*h*-10 may include a plurality of RF chains. Moreover, the RF processor 1*h*-10 may perform beamforming. For the beamforming, the RF processor 1*h*-10 may control the phase and the size of each signal transmitted or received via a plurality of antennas or antenna elements. In addition, the RF processor may perform MIMO, and may receive multiple layers when performing an MIMO operation.

The baseband processor 1*h*-20 performs a function for conversion between a baseband signal and a bitstream according to the physical layer standard of a system. For example, in the case of data transmission, the baseband processor 1*h*-20 encodes and modulates a transmission bitstream, so as to produce complex symbols. In addition, in the case of data reception, the baseband processor 1*h*-20 restores a reception bitstream by demodulating and decoding a baseband signal provided from the RF processor 1*h*-10. For example, according to an orthogonal frequency division multiplexing (OFDM) scheme, in the case of data transmission, the baseband processor 1*h*-20 produces complex symbols by encoding and modulating a transmission bitstream, maps the complex symbols onto subcarriers, and then configures OFDM symbols via an inverse fast Fourier transform (IFFT) operation and cyclic prefix (CP) insertion. Further, in the case of data reception, the baseband processor 1*h*-20 divides a baseband signal provided from the RF processor 1*h*-10 in units of OFDM symbols, reconstructs signals mapped onto subcarriers via a fast Fourier transform (FFT) operation, and then reconstructs a reception bitstream via demodulation and decoding.

The baseband processor 1h-20 and the RF processor 1h-10 transmit and receive signals as described above. Accordingly, the baseband processor 1h-20 and the RF processor 1h-10 may be referred to as a transmitter, a receiver, a transceiver, or a communication unit. Furthermore, at least one of the baseband processor 1h-20 and the RF processor 1h-10 may include a plurality of communication modules in order to support multiple different radio access technologies. In addition, at least one of the baseband processor 1h-20 and the RF processor 1h-10 may include different communication modules to process signals of different frequency bands. For example, the different radio access technologies may include a wireless LAN (e.g., IEEE 802.11), a cellular network (e.g., LTE), and the like. Further, the different frequency bands may include a super high frequency (SHF) (e.g., 2.NRHz, NRhz) band and a millimeter (mm) wave (e.g., 60 GHz) band.

The storage 1h-30 stores data such as a basic program, an application program, and configuration information for operation of the UE. Particularly, the storage 1h-30 may store information related to a second access node that performs wireless communication using a second radio access technology. In addition, the storage 1h-30 provides data stored therein in response to a request from the controller 1h-40.

The controller 1h-40 controls overall operation of the UE. For example, the controller 1h-40 may perform transmission or reception of a signal via the baseband processor 1h-20 and the RF processor 1h-10. In addition, the controller 1h-40 may record data in the storage 1h-40 and may read the data. To this end, the controller 1h-40 may include at least one processor. For example, the controller 1h-40 may include a communication processor (CP) that performs control for communication, and an application processor (AP) that controls a higher layer such as an application program. The controller 1h-40 may further include a multi-connection processor 1h-42 for supporting multiple connections.

FIG. 1I is a block diagram of a BS in a wireless communication system according to an embodiment of the disclosure.

As illustrated in the drawing, the BS may include an RF processor 1i-10, a baseband processor 1i-20, a backhaul communication unit 1i-30, a storage 1i-40, and a controller 1i-50.

The RF processor 1i-10 performs a function for transmitting or receiving a signal via a wireless channel, such as band conversion and amplification of a signal. That is, the RF processor 1i-10 up-converts a baseband signal provided from the baseband processor 1i-20 into an RF band signal, transmits the RF band signal via an antenna, and down-converts an RF band signal received via the antenna into a baseband signal. For example, the RF processor 1i-10 may include a transmission filter, a reception filter, an amplifier, a mixer, an oscillator, a DAC, an ADC, and the like. Although the drawing illustrates only a single antenna, the BS may include a plurality of antennas. In addition, the RF processor 1i-10 may include a plurality of RF chains. Moreover, the RF processor 1i-10 may perform beamforming. For the beamforming, the RF processor 1i-10 may control the phase and the size of each of the signals transmitted or received via a plurality of antennas or antenna elements. The RF processor may perform a downlink MIMO operation by transmitting one or more layers.

The baseband processor 1i-20 performs a function for conversion between a baseband signal and a bitstream according to the physical layer standard of a first radio access technology. For example, in the case of data transmission, the baseband processor 1i-20 encodes and modulates a transmission bitstream, so as to produce complex symbols. In addition, in the case of data reception, the baseband processor 1i-20 restores a reception bitstream by demodulating and decoding a baseband signal provided from the RF processor 1i-10. For example, according to the OFDM scheme, in the case of data transmission, the baseband processor 1i-20 may produce complex symbols by encoding and modulating a transmission bitstream, map the complex symbols onto subcarriers, and then configure OFDM symbols via an IFFT operation and CP insertion. Further, in the case of data reception, the baseband processor 1i-20 divides a baseband signal provided from the RF processor 1i-10 in units of OFDM symbols, reconstructs signals mapped onto the subcarriers via an FFT operation, and then reconstructs a reception bitstream via demodulation and decoding. The baseband processor 1h-20 and the RF processor 1i-10 transmit and receive signals as described above. Accordingly, the baseband processor 1i-20 and the RF processor 1i-10 may be referred to as a transmitter, a receiver, a transceiver, a communication unit, or a wireless communication unit.

The backhaul communication unit 1i-30 may provide an interface for performing the communication with other nodes in a network. That is, the backhaul communication unit 1i-30 may convert, into a physical signal, a bitstream transmitted from the BS to another node, for example, a secondary BS, a core network, and the like, and may convert a physical signal received from the other node into a bitstream.

The storage 1i-40 stores data such as a basic program, an application program, and configuration information for operation of the master BS. Particularly, the storage 1i-40 may store information associated with a bearer allocated to a connected UE, a measurement result reported from a connected UE, and the like. In addition, the storage 1i-40 may store information which is a criterion for determining whether to provide or suspend multiple connections to a UE In addition, the storage 1i-40 provides data stored therein in response to a request from the controller 1i-50.

The controller 1i-50 may control overall operation of the BS. For example, the controller 1i-50 may transmit or receive a signal via the baseband processor 1i-20 and the RF processor 1i-10, or via the backhaul communication unit 1i-30. In addition, the controller 1i-50 may record data in the storage 1i-40 and read the data. To this end, the controller 1i-50 may include at least one processor. The controller may further include a multi-connection processor 1i-52 for supporting multiple connections.

Second Embodiment

Figure 2A:
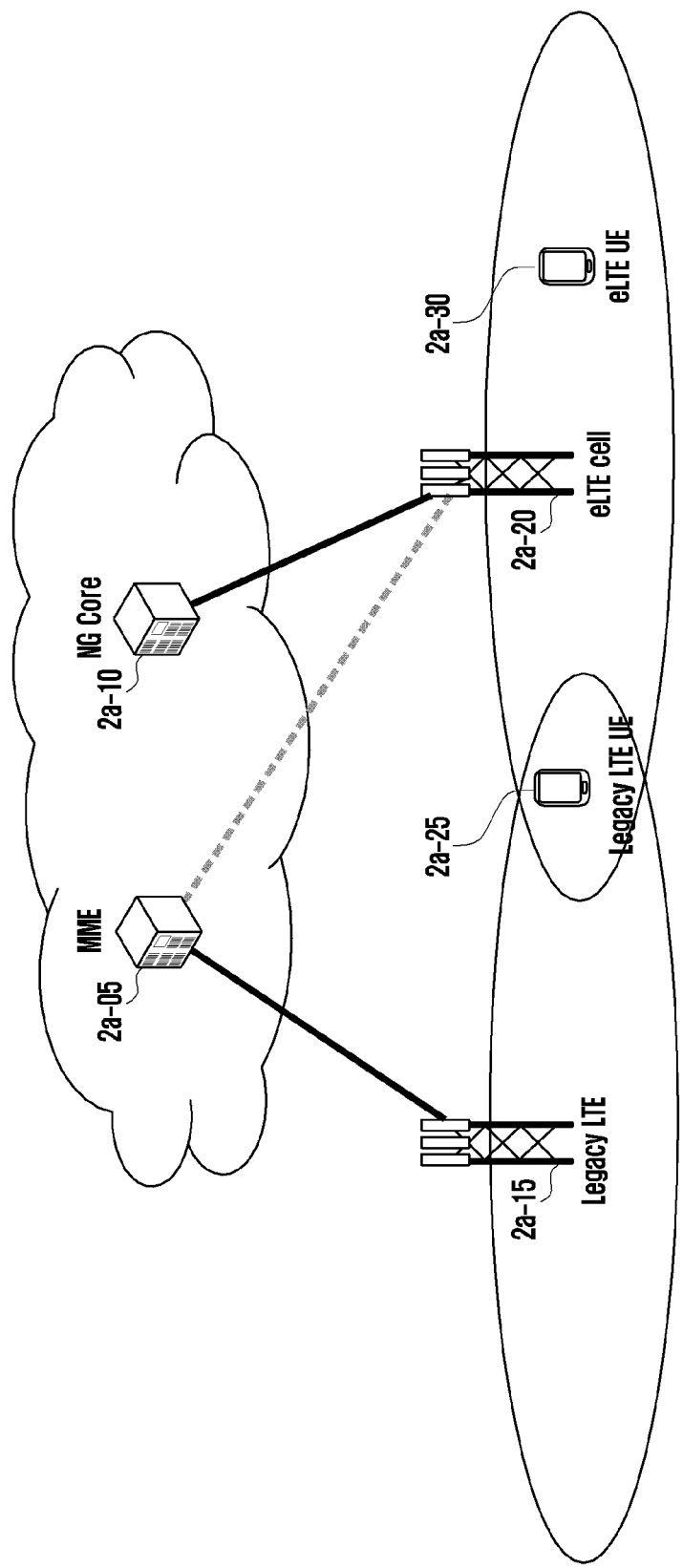
FIG. 2A is a diagram illustrating an LTE BS connected to a next generation mobile communication network.

FIG. 2A is a diagram illustrating an LTE BS connected to a next generation mobile communication network.

A legacy LTE BS 2a-15 is connected to an MME 2a-05 which is a single network entity. Conversely, to a next generation mobile communication network (NG core) 2a-10, a next generation mobile communication BS may be connected. However, a legacy LTE BS may be upgraded and may be connected to the next generation mobile communication network. The upgraded LTE BS is referred to as an evolved/enhanced LTE (eLTE) BS 2a-20. The eLTE BS may be connected to a legacy MME or a next generation mobile communication network (NG core), or may be connected to both. If the eLTE BS is connected only to the NG core, only a UE 2a-30 that supports eLTE may be connected to the eLTE BS, and may be capable of performing communication with the next generation mobile communication network. Conversely, although a legacy UE 2a-25 attempts to connect to the eLTE BS, the legacy UE 2a-25 is incapable of performing communication with the next generation mobile communication network. Therefore, the legacy UE needs to be prevented from camping on the eLTE BS that is only connected to the NG core. If the eLTE BS is connected both the NG core and EPC, the BS may support both a UE that supports eLTE and a legacy UE. Connection to a network supportable by a corresponding UE may be established for each UE.

Figure 2B:
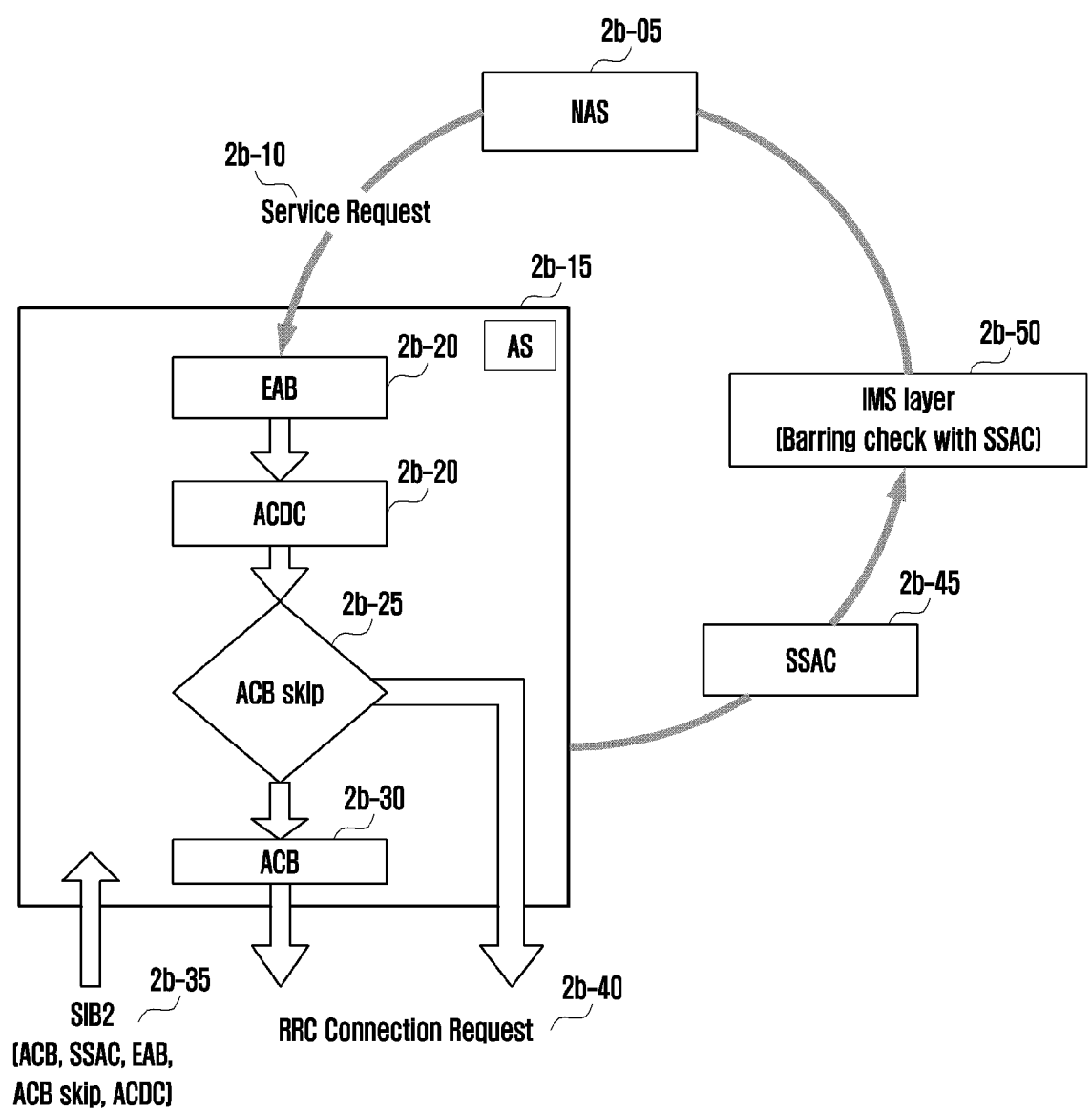
FIG. 2B is a diagram illustrating a process of performing UE access control in an LTE system.

FIG. 2B is a diagram illustrating a method of determining whether to grant access in a legacy LTE system. The inside of an LTE UE is divided into an access stratum (AS) 2b-15 and a non access stratum (NAS) 2b-05 from the perspective of a function. The AS performs all functions related to access, and the NAS performs functions irrelevant to access, such as selecting a public land mobile network (PLMN), requesting a service, or the like. Whether access is available is mainly determined in the UE AS. A network may limit new access if the network is congested. To this end, the network may broadcast related configuration information so that each UE is capable of determining whether access is available in operation 2b-35. In the legacy LTE system, a new barring mechanism is also proposed as new requirements are added. Accordingly, the UE needs to perform a plurality of access check procedures (access barring check). If the UE NAS transfer a service request 2b-10 to the UE AS, the UE AS may check whether access is available in order to determine whether access to the network is actually available, in response to the request. If the establishment cause value of the service request is "delay tolerant access", the UE AS may perform extended access barring (EAB) 2b-20 first. The EAB barring mechanism is an access check procedure applied only to a machine type communication (MTC) device. After the EAB, the UE AS may perform application specific congestion control for data communication (ACDC) 2b-20 or access class barring (ACB) 2b-30. An application of which the service is requested may be assigned with a single piece of ACDC category information, and the value of the ACDC category may be provided to the UE AS by being included in the service request. The network may provide barring configuration information for each ADCD category. That is, the UE AS may perform access check procedure for each application group classified based on an ACDC category. If the barring configuration information associated with the ACDC category is not provided from the network, the UE AS may omit the ACDC access check procedure. The UE AS may perform access class barring (ACB) 2b-30. The ACB is an access check procedure performed using barring configuration information separately provided according to mobile originating data (MO) or MO signaling. For multimedia telephony (MINI-TEL) voice/video/short message service (SMS), the procedure of performing ACB may be omitted using an ACB skip indicator in operation 2b-25. If it is determined that all of the above-mentioned plurality of access check procedures result in "accessible", the UE AS may attempt to access the network. That is, the UE AS performs random access, and may transmit an RRC connection request message 2b-40 to the BS. There is an access check procedure that the UE AS does not perform. If the UE AS receives barring configuration information 2b-45 (S SAC) associated with the MINI-TEL voice/video from the network, the UE AS may transfer the same to an IP multimedia subsystem (IMS) layer 2b-50 in the UE which manages the service. The IMS layer that receives the barring configuration information may perform an access check procedure when the service is triggered. When a service specific access class (SSAC) was introduced, the UE AS was designed to perform a function irrespective of the type of application or service. Therefore, in order to control whether to grant access in association with only a predetermined service such as MMTEL voice/video or the like, barring configuration information needs to be directly transferred to a layer that manages the corresponding service, so that the layer performs an access check procedure.

For example, in the legacy LTE system, the ACDC was proposed for the purpose of determining whether access is available for each application (service). Each application is assigned with at least one ACDC category value. The ACDC category is a value between 1 to 16. The network may provide corresponding ACDC category information for each application to the UE NAS using a NAS message. The network may provide barring configuration information applied to a corresponding ACDC category using system information block type 2 (SIB2). The barring configuration information may include an ac-BarringFactor IE and an ac-Barringtime IE. The ac-BarringFactor $\alpha$ is in the range of $0 \le \alpha < 1$. The UE AS obtains "rand" which is a random value in the range of $0 \le rand < 1$. If the random value is less than ac-BarringFactor, it is determined that access is not banned. Otherwise, it is determined that access is banned. If it is determined that access is banned, the UE AS delays attempting access during a predetermined period of time obtained using Equation 1 given below.

$$\text{``}T\text{barring''} = (0.7 + 0.6 * \text{rand}) * ac\text{-BarringTime.} \quad [\text{Equation 1}]$$

If a service request is triggered by the UE NAS, the UE AS may obtain an ACDC category value corresponding to an application desired to be serviced. In addition, if the UE NAS transfers the service request to the UE AS, the obtained ACDC category value may be included therein and may be transferred to the UE AS. The UE AS that receives the service request may determine whether to grant access using the ACDC barring configuration information included in the SIB2, based on the ACDC category value. If the barring configuration information corresponding to the ACDC category does not exist in the SIB2, the UE AS regards that access of the application associated with the ACDC category has been granted in the ACDC procedure. If access is granted via the access grant check procedures, the UE AS performs random access to the network and transmits an RRC connection request message in operation 2b-40.

Figure 2C:
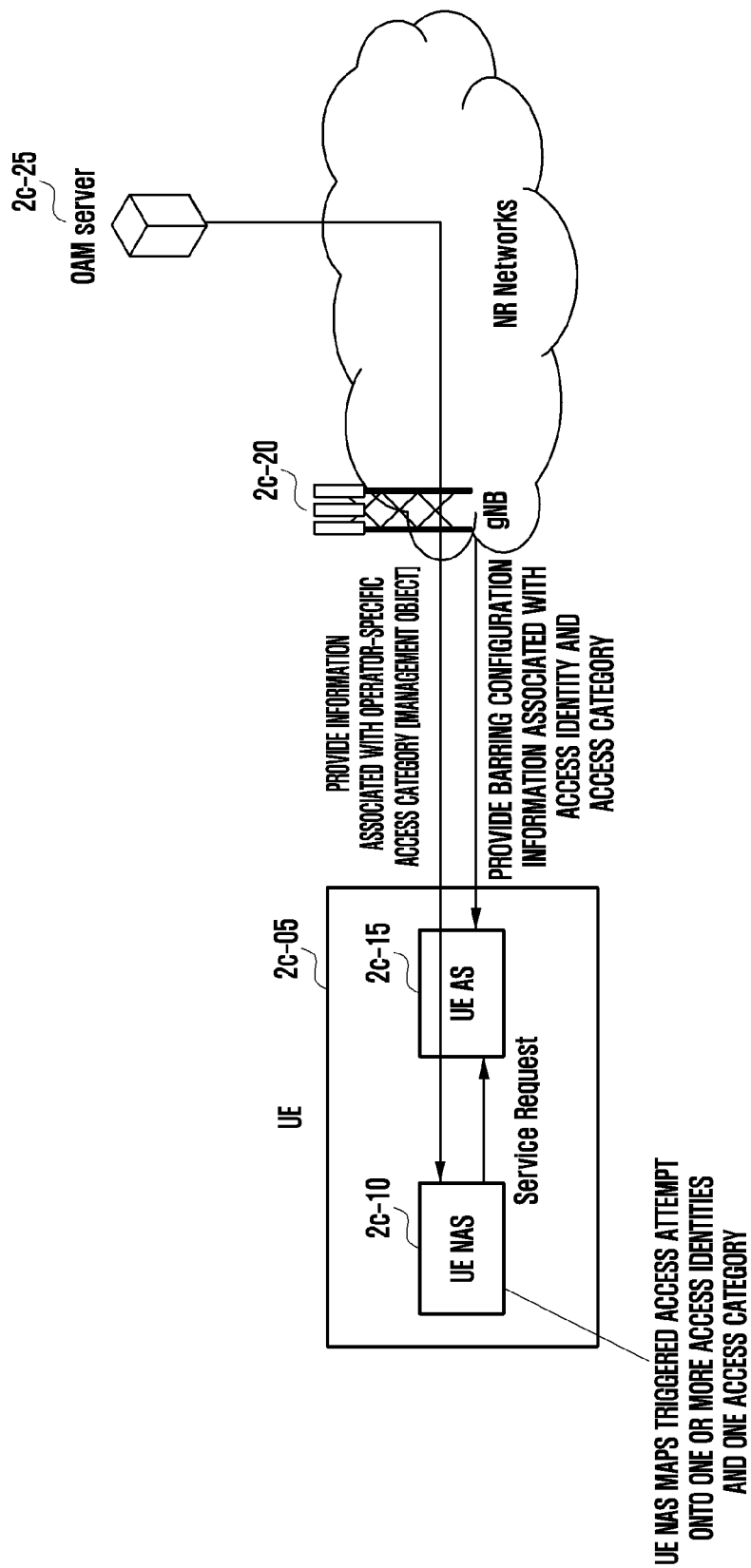
FIG. 2C is a diagram illustrating a process of performing UE access control in a next generation mobile communication system.

FIG. 2C is a diagram illustrating a process of performing UE access control according to the disclosure. In the disclosure, there is provided an access control scheme based on an access identity and an access category, similarly to a legacy ACDC. An access identity is indication information defined in 3GPP, that is, indication information clearly mentioned in the standard document. The access identity is used for indicating predetermined access, as shown in Table 1 provided below. The access identity indicates accesses classified based on access classes 11 to 15, a multimedia priority service (MPS), and a mission critical service (MCS). The access classes 11 to 15 indicate dedicated accesses for a business operator or a person interested, or for public purpose.

TABLE 1

| Access Identity number | UE configuration |
|---|---|
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

NOTE 1:

Access Identity 1 is used to provide overrides according to the subscription information in UEs configured for MPS. subscription information defines whether an overide applies to UEs within one of the following categories:
a) UEs that are configured for MPS;
b) UEs that are configured for MPS and are in the PLMN listed as most preferred PLMN of the country where the UE is roaming in the operator-defined PLMN selector list or in their HPLMN or in a PLMN that is equivalent to their HPLMN;
c) UEs that are configured for MPS and are in their HPLMN or in a PLMN that is equivalent to it.

NOTE 2:

Access Identity 2 is used to provide overrides according to the subscription information in UEs configured for MCS. The subscription information defines whether an overide applies to UEs within one of the following categories:
a) UEs that are configured for MCS;
b) UEs that are configured for MCS and are in the PLMN listed as most preferred PLMN of the country where the UE is roaming in the operator-defined PLMN selector list or in their HPLMN or in a PLMN that is equivalent to their HPLMN;
c) UEs that are configured for MCS and are in their HPLMN or in a PLMN that is equivalent to it.

NOTE 3:

Access Identities 11 and 15 are valid in Home PLMN only if the EHPLMN list is not present or in any EHPLMN. Access Identities 12, 13 and 14 are valid in Home PLMN and visited PLMNs of home country only. For this purpose the home country is defined as the country of the MCC part of the IMSI.

The access category is divided into two classes. One is a "standardized access category". The standardized access category is a category defined in an RAN level, that is, a category that is clearly mentioned in the standard document. Therefore, the same standardized access category is applied to different business operators. In the disclosure, a category corresponding to "emergency" falls within the standardized access category. All accesses may correspond to at least one included in the standardized access category. The other is an "operator-specific (i.e., non-standardized) access category". The operator-specific category is defined outside 3GPP, and is not specified in the standardized document. Therefore, an operator-specific access category indicates a different meaning for each operator. This is the same characteristic as that of a category in the legacy ACDC. An access triggered by a UE NAS may not be mapped onto an operator-specific access category. A big difference from the legacy ACDC is that the category corresponds not only to an application, but also to factors other than the application, that is, a service type, a call type, a UE type, a user group, a signaling type, a slice type, or a combination of the factors. That is, according to an access category, a UE AS may control whether to grant access in association with accesses corresponding to other factors other than an application. The access category is used for indicating predetermined access, as shown in Table 2 provided below. Access categories #0 to 7 are used for indicating a "standardized access category", and access categories #32 to 63 are used for indicating an "operator-specific access category".

TABLE 2

| Access Category number | Conditions related to UE | Type of access attempt |
|---|---|---|
| 0 | All | MO Signalling resulting from paging |
| 1 (NOTE 1) | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signalling resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories |
| 8-31 | | Reserved standardized Access Categories |
| 32-63 (NOTE 2) | All | Based on operator classification |

NOTE 1:
The barring parameter for Access Category 1 is accompanied with information that define whether Access Category applies to UEs within one of the following categories:
a) UEs that are configured for delay tolerant service;
b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN selector list on the SIM/USIM, nor in their HPLMN nor in a PLMN that is equivalent to their HPLMN.

NOTE 2:
When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.

An operator server 2c-25 may provide information (management object (MO)) associated with operator-specific access category information to the UE NAS via NAS signaling or application level data transmission. The information may indicate a factor, such as an application or the like, which corresponds to a corresponding operator-specific category. For example, the information may include that access category #32 corresponds to an access that corresponds to the Facebook application. A gNB 2c-20 provides a list of categories of which barring configuration information are provided, and barring configuration information corresponding to a corresponding category to UEs via system information. A UE 2c-05 includes logical blocks of an NAS 2c-10 and an AS 2c-15. The UE NAS may map a triggered access onto one or more access identities and one access category, according to a predetermined rule. According to another option, in the access category mapping process, one access is mapped onto one standardized access category, and additionally, may be mapped onto an operator-specific access category. The UE NAS transfers, to the UE AS, the mapped access identity and access category together with a service request. The UE AS determines whether the access triggered by the UE NAS is allowed (i.e., barring check), using the barring configuration information.

If both EPC and 5GC are connected to an eLTE BS, the eLTE BS may support both a legacy UE and an eLTE UE. The legacy UE may determine whether access is allowed, using the above-described LTE access control mechanism.

In the LTE system, barring configuration information is provided to UEs via SIB2. In the disclosure, this is referred to as LTE barring configuration information. Conversely, the eLTE UE may determine whether access is allowed, using the above-described next generation mobile communication NR access control mechanism. Barring configuration information applied in NR access control is different from barring configuration information applied in LTE. In the disclosure, this is referred to as NR barring configuration information. Therefore, if the eLTE BS is capable of supporting both the legacy UE and the eLTE UE, the eLTE BS needs to provide two types of barring configuration information to two types of UEs using system information. In the disclosure, there is provided a method of providing the two types of barring configuration information to UE by including the same in SIB2 or SIBx that only the eLTE UE is capable of understanding, depending on whether the eLTE BS is capable of supporting only the eLTE UE or supporting both the legacy UE and the eLTE UE. Particularly, if the eLTE BS supports only the eLTE UE, the eLTE BS includes NR barring configuration information in the SIBx or SIB2. If the eLTE BS is capable of supporting both the legacy UE and the eLTE UE, the eLTE BS includes LTE barring configuration information in SIB2 and includes NR barring configuration information in SIBx.

The SIB2 is system information that both the legacy UE and the eLTE UE are capable of understanding. However, if both the LTE barring configuration information and the NR barring configuration information are included in SIB2, the size of SIB2 may be increased. The amount of information that each SIB is capable of storing is limited. Therefore, depending on the size of barring configuration information to be provided, SIB2 may not store the entirety of the barring configuration information. In addition, even through NR barring configuration information is included in SIB2, it is unnecessary information for the legacy UE. The legacy UE is incapable of understanding the NR barring configuration information. Therefore, in the disclosure, if the eLTE BS is capable of supporting both the legacy UE and the eLTE UE, LTE barring configuration information is included in SIB2, and NR barring configuration information is included in SIBx. The eLTE UE is capable of understanding the SIBx. However, the legacy UE is incapable of understanding the SIBx and may not need to receive the same. SIB1 includes scheduling information associated with SIBx, and the legacy UE is incapable of understanding the scheduling information associated with the SIBx included in the SIB1. The eLTE UE may identify the location of a radio resource in which SIBx is transmitted, by taking into consideration both scheduling information associated with existing SIBs and the scheduling information associated with SIBx, included in SIB1. In the case in which the eLTE BS supports only the eLTE UE, LTE barring configuration information may not need to be provided. Therefore, it is no burden for SIB2 to store NR barring configuration information. In this instance, the eLTE BS may include the NR barring configuration in SIB2. Alternatively, for unity, the eLTE BS may always include NR barring configuration information in SIBx, irrespective of whether the eLTE BS supports the legacy UE. However, in this instance, the scheduling information associated with SIBx needs to be included in SIB1.

Figure 2D:
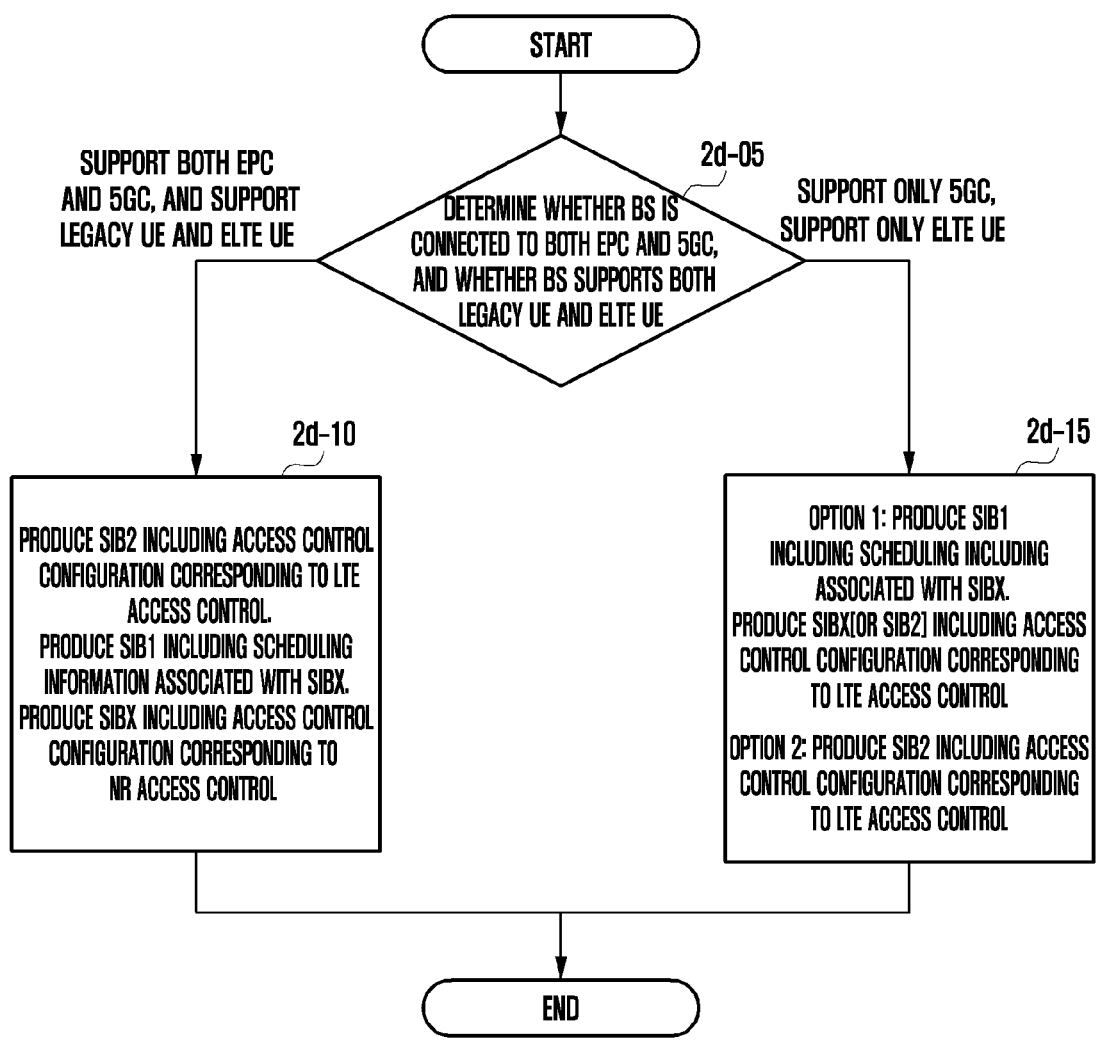
FIG. 2D is a flowchart illustrating an operation of providing access configuration information by a BS according to an embodiment of the disclosure.

FIG. 2D is a flowchart illustrating an operation of providing access configuration information by a BS according to an embodiment of the disclosure.

In operation 2d-05, an eLTE BS determines whether the eLTE BS is connected to both EPC and 5GC, and whether the eLTE BS supports both a legacy UE and an eLTE UE.

In operation 2d-10, if the eLTE BS is connected to both EPC and 5GC, and supports both the legacy UE and the eLTE UE, the eLTE BS stores LTE barring configuration information in SIB2. The eLTE BS additionally stores scheduling information associated with SIBx in SIB 1. For reference, SIB2 belongs to essential SIB in LTE, and thus SIB1 always includes scheduling information associated with SIB2. The eLTE BS may store NR barring configuration information in SIBx. The eLTE BS may broadcast the configured Ms.

In operation 2d-15, if the eLTE BS is connected to only 5GC, and supports only the eLTE UE, the eLTE BS may store LTE barring configuration information in SIB2. As another option, scheduling information associated with SIBx is additionally stored in SIB1, and NR barring configuration information is stored in SIBx. The eLTE BS may broadcast the configured SIBs.

Figure 2E:
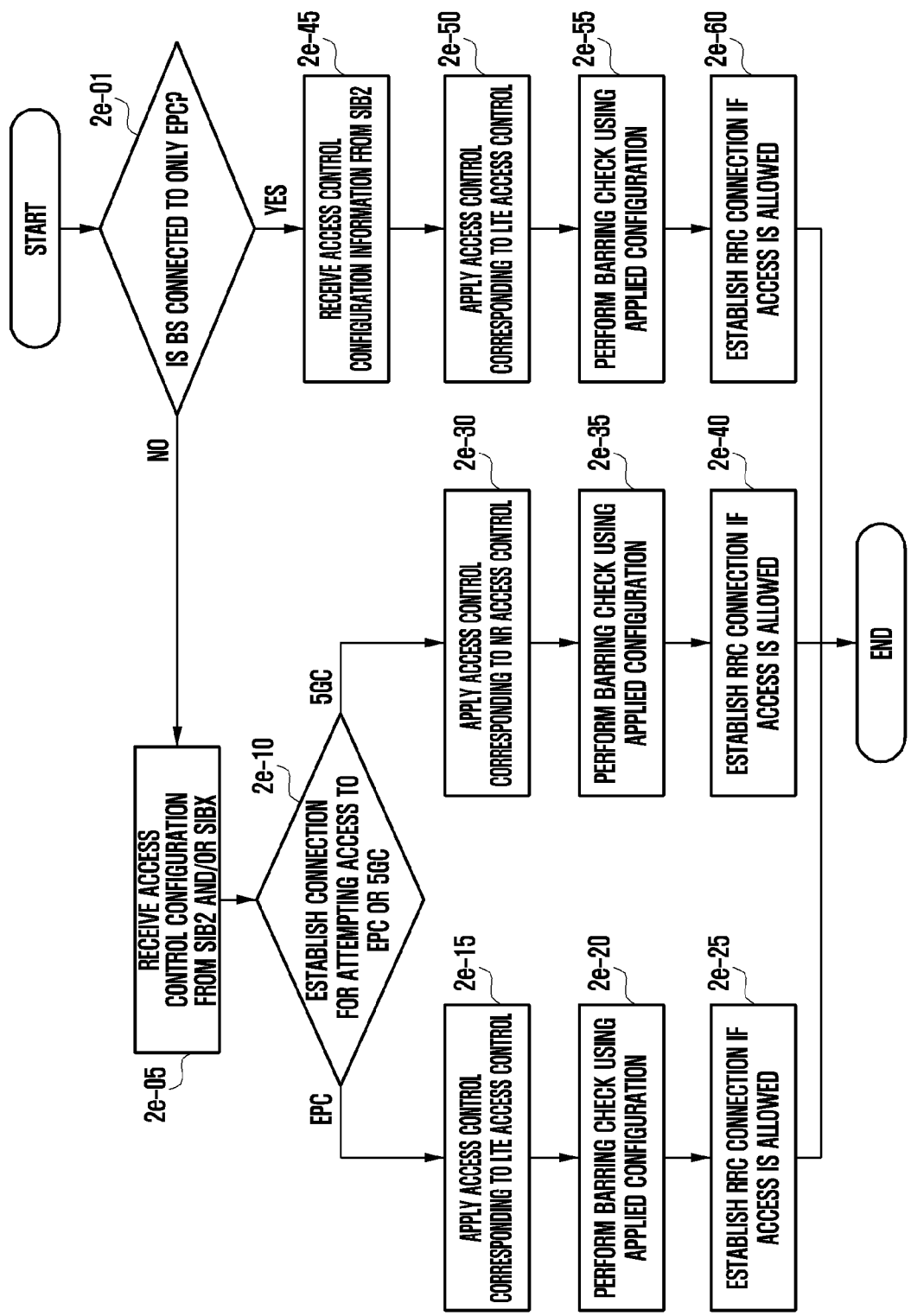
FIG. 2E is a flowchart illustrating an operation of receiving and applying access configuration information by a UE according to an embodiment of the disclosure.

FIG. 2E is a flowchart illustrating an operation of receiving and applying access configuration information by an eLTE UE according to an embodiment of the disclosure.

In operation 2e-01, the eLTE UE is capable of communicating with eLTE connected to 5GC. The UE determines whether an LTE BS that the UE currently camps on is connected to only EPC. The UE may recognize whether the LTE BS is connected to EPC or 5GC, or is connected to both, based on PLMN information provided via system information. Each PLMN corresponds to one of EPC or 5GC. An LTE BS that is connected to only EPC, is capable of supporting only a legacy UE. Accordingly, the eLTE UE may camp on the LTE BS as a legacy UE. If the eLTE UE does not include a legacy UE function, the eLTE UE is incapable of communicating with the LTE BS that is connected to only EPC, and needs to search for another BS to camp on.

In operation 2e-05, if the LTE BS is connected to 5GC or is connected to both 5GC and EPC, the UE may receive and store LTE barring configuration information and NR barring configuration information from SIBx and SIB2 broadcasted from the BS.

In operation 2e-10, the UE may determine one of 5GC or EPC for accessing. If the BS is connected to only 5GC, the UE may select only 5GC.

In operation 2e-15, if EPC is selected, the UE may apply LTE barring configuration information.

In operation 2e-20, if access is triggered, the UE may perform barring check using the LTE barring configuration information.

In operation 2e-25, the UE may perform a connection establishment process with respect to the BS if it is identified that access is allowed via the barring check.

In operation 2e-30, if 5GC is selected, the UE may apply NR barring configuration information.

In operation 2e-35, if access is triggered, the UE may perform barring check using the NR barring configuration information.

In operation 2e-40, the UE may perform a connection establishment process with respect to the BS if it is identified that access is allowed via the barring check.

In operation 2e-45, the UE receives and store LTE barring configuration information from SIB2 broadcasted from the BS.

In operation 2e-50, if EPC is selected, the UE may apply LTE barring configuration information.

In operation 2e-55, if access is triggered, the UE may perform barring check using the LTE barring configuration information.

In operation 2e-60, the UE may perform a connection establishment process with respect to the BS if it is identified that access is allowed via the barring check.

Figure 2F:
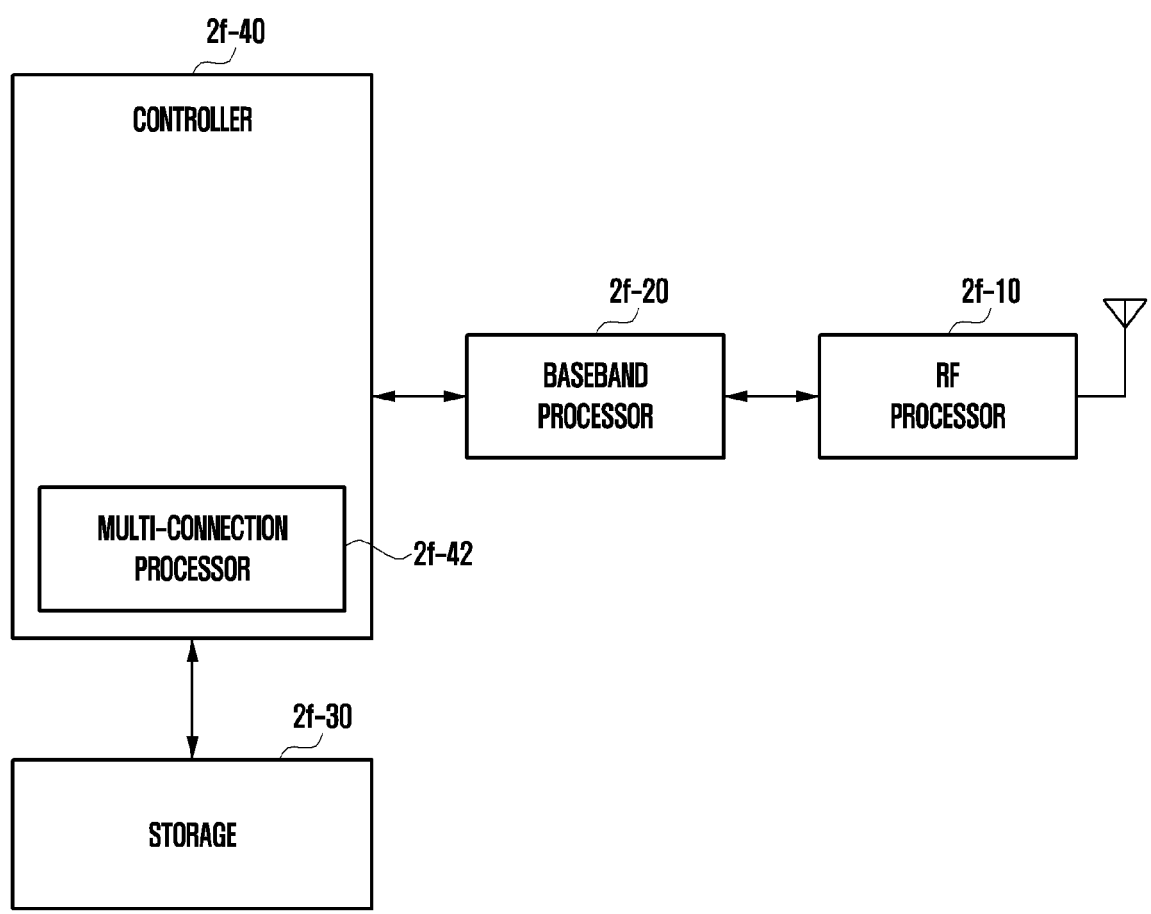
FIG. 2F is a block diagram illustrating the internal structure of a UE according to an embodiment of the disclosure.

FIG. 2F is a diagram illustrating the structure of a UE according to an embodiment of the disclosure.

Referring to the drawing, the UE includes a radio frequency (RF) processor 2f-10, a baseband processor 2f-20, a storage 2f-30, and a controller 2f-40.

The RF processor 2f-10 performs a function for transmitting or receiving a signal via a wireless channel, such as band conversion and amplification of a signal. That is, the RF processor 2f-10 up-converts a baseband signal provided from the baseband processor 2f-20 into an RF band signal, transmits the RF band signal via an antenna, and down-converts an RF band signal received via the antenna into a baseband signal. For example, the RF processor 2f-10 may include a transmission filter, a reception filter, an amplifier, a mixer, an oscillator, a digital-to-analog converter (DAC), an analog-to-digital converter (ADC), and the like. Although the drawing illustrates only a single antenna, the UE may include a plurality of antennas. In addition, the RF processor 2f-10 may include a plurality of RF chains. Moreover, the RF processor 2f-10 may perform beamforming. For the beamforming, the RF processor 2f-10 may control the phase and the size of each signal transmitted or received via a plurality of antennas or antenna elements. In addition, the RF processor may perform MIMO, and may receive multiple layers when performing an MIMO operation.

The baseband processor 2f-20 performs a function for conversion between a baseband signal and a bitstream according to the physical layer standard of a system. For example, in the case of data transmission, the baseband processor 2f-20 encodes and modulates a transmission bitstream, so as to produce complex symbols. In addition, in the case of data reception, the baseband processor 2f-20 restores a reception bitstream by demodulating and decoding a baseband signal provided from the RF processor 2f-10. For example, according to an orthogonal frequency division multiplexing (OFDM) scheme, in the case of data transmission, the baseband processor 2f-20 produces complex symbols by encoding and modulating a transmission bitstream, maps the complex symbols onto subcarriers, and then configures OFDM symbols via an inverse fast Fourier transform (IFFT) operation and cyclic prefix (CP) insertion. Further, in the case of data reception, the baseband processor 2f-20 divides a baseband signal provided from the RF processor 2f-10 in units of OFDM symbols, reconstructs signals mapped onto subcarriers via a fast Fourier transform (FFT) operation, and then reconstructs a reception bitstream via demodulation and decoding.

The baseband processor 2f-20 and the RF processor 2f-10 transmit and receive signals as described above. Accordingly, the baseband processor 2f-20 and the RF processor 2f-10 may be referred to as a transmitter, a receiver, a transceiver, or a communication unit. Furthermore, at least one of the baseband processor 2f-20 and the RF processor 2f-10 may include a plurality of communication modules in order to support different multiple radio access technologies. In addition, at least one of the baseband processor 2f-20 and the RF processor 2f-10 may include different communication modules to process signals of different frequency bands. For example, the different radio access technologies may include a wireless LAN (e.g., IEEE 802.11), a cellular network (e.g., LTE), and the like. Further, the different frequency bands may include a super high frequency (SHF) (e.g., 2.NRHz, NRhz) band and a millimeter (mm) wave (e.g., 60 GHz) band.

The storage 2f-30 stores data such as a basic program, an application program, and configuration information for the operation of the UE. Particularly, the storage 2f-30 may store information related to a second access node that performs wireless communication using a second radio access technology. In addition, the storage 2f-30 provides data stored therein in response to a request from the controller 2f-40.

The controller 2f-40 controls overall operation of the UE. For example, the controller 2f-40 may perform transmission or reception of a signal via the baseband processor 2f-20 and the RF processor 2f-10. In addition, the controller 2f-40 may record data in the storage 2f-40 and read the data. To this end, the controller 2f-40 may include at least one processor. For example, the controller 2f-40 may include a communication processor (CP) that performs control for communication, and an application processor (AP) that controls a higher layer such as an application program. The controller 2f-40 may further include a multi-connection processor 2f-42 for supporting multiple connections.

Figure 2G:
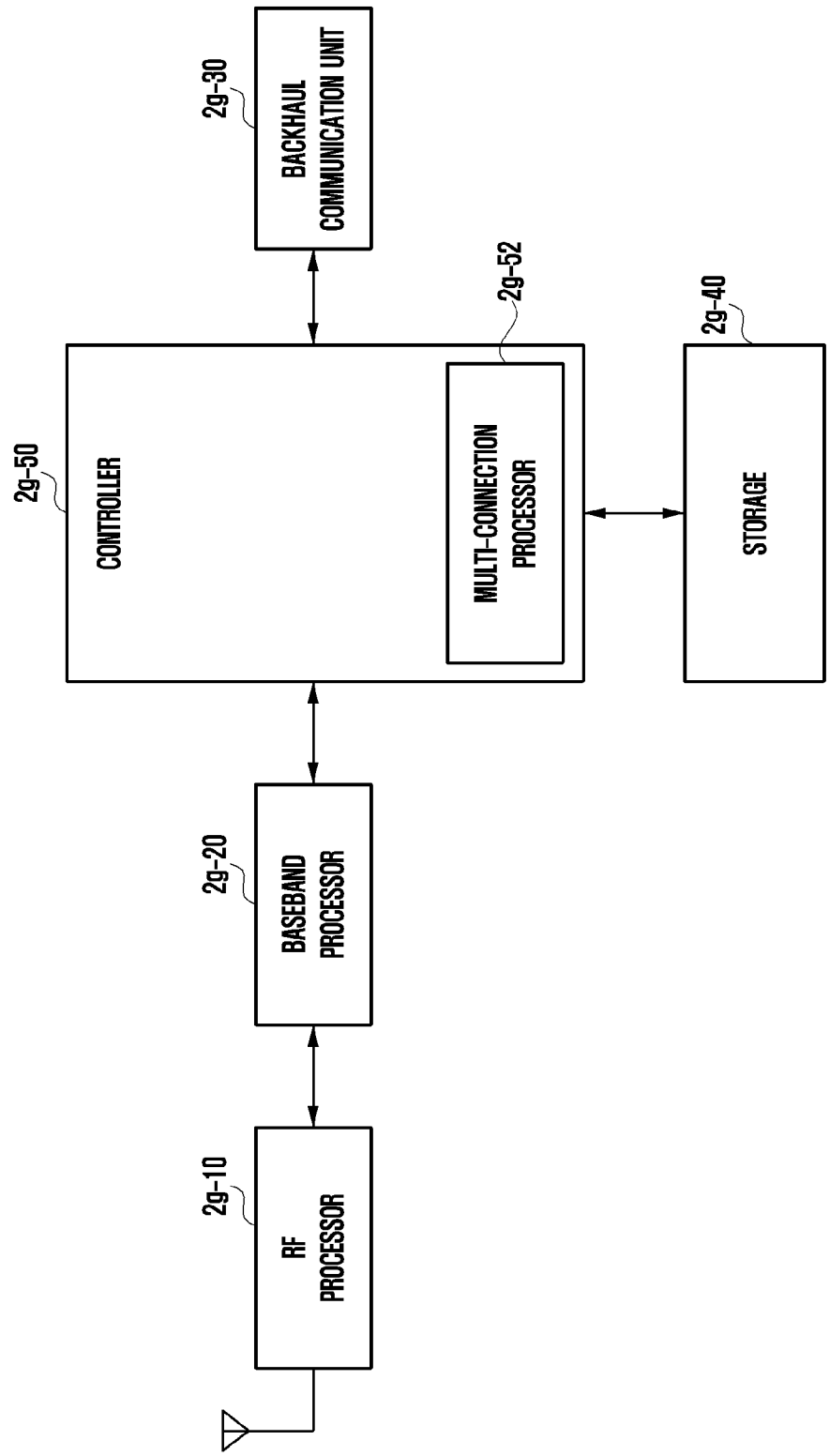
FIG. 2G is a block diagram illustrating the configuration of a BS according to an embodiment of the disclosure.

FIG. 2G is a block diagram of a BS in a wireless communication system according to an embodiment of the disclosure.

As illustrated in the drawing, the BS may include an RF processor 2g-10, a baseband processor 2g-20, a backhaul communication unit 2g-30, a storage 2g-40, and a controller 2g-50.

The RF processor 2g-10 performs a function for transmitting or receiving a signal via a wireless channel, such as band conversion and amplification of a signal. That is, the RF processor 2g-10 up-converts a baseband signal provided from the baseband processor 2g-20 into an RF band signal so as to transmit the RF band signal via an antenna, and down-converts an RF band signal received via the antenna into a baseband signal. For example, the RF processor 2g-10 may include a transmission filter, a reception filter, an amplifier, a mixer, an oscillator, a DAC, an ADC, and the like. Although the drawing illustrates only a single antenna, the first access node may include a plurality of antennas. In addition, the RF processor 2g-10 may include a plurality of RF chains. Moreover, the RF processor 2g-10 may perform beamforming. For the beamforming, the RF processor 2g-10 may control the phase and the size of each of the signals transmitted or received via a plurality of antennas or antenna elements. The RF processor may perform a downlink MIMO operation by transmitting one or more layers.

The baseband processor 2g-20 performs a function for conversion between a baseband signal and a bitstream according to the physical layer standard of a first radio access technology. For example, in the case of data transmission, the baseband processor 2g-20 encodes and modulates a transmission bitstream, so as to produce complex symbols. In addition, in the case of data reception, the baseband processor 2g-20 restores a reception bitstream by demodulating and decoding a baseband signal provided from the RF processor 2g-10. For example, according to the OFDM scheme, in the case of data transmission, the baseband processor 2g-20 may produce complex symbols by encoding and modulating a transmission bitstream, map the complex symbols onto subcarriers, and then configure OFDM symbols via an IFFT operation and CP insertion. Further, in the case of data reception, the baseband processor 2g-20 divides a baseband signal provided from the RF processor 2g-10 in units of OFDM symbols, reconstructs signals mapped onto the subcarriers via a FFT operation, and then reconstructs a reception bitstream via demodulation and decoding. The baseband processor 2g-20 and the RF processor 2g-10 transmit and receive signals as described above. Accordingly, the baseband processor 2g-20 and the RF processor 2g-10 may be referred to as a transmitter, a receiver, a transceiver, a communication unit, or a wireless communication unit.

The backhaul communication unit 2g-30 may provide an interface for performing communication with other nodes in a network. That is, the backhaul communication unit 2g-30 may convert, into a physical signal, a bitstream transmitted from the master BS to another node, for example, a secondary BS, a core network, and the like, and may convert a physical signal received from the other node into a bitstream.

The storage 2g-40 stores data such as a basic program, an application program, and configuration information for the operation of the master BS. Particularly, the storage 2g-40 may store information associated with a bearer allocated to a connected UE, a measurement result reported from a connected UE, and the like. In addition, the storage 2g-40 may store information which is a criterion for determining whether to provide or suspend multiple connections to a UE. In addition, the storage 2g-40 provides data stored therein in response to a request from the controller 2g-50.

The controller 2g-50 may control the overall operation of the master BS. For example, the controller 2g-50 may transmit or receive a signal via the baseband processor 2g-20 and the RF processor 2g-10, or via the backhaul communication unit 2g-30. In addition, the controller 2g-50 may record data in the storage 2g-40 and read the data. To this end, the controller 2g-50 may include at least one processor. The controller 2g-50 may further include a multi-connection processor 2g-52 for supporting multiple connections.

The embodiments of the disclosure described and shown in the specification and the drawings have been presented to easily explain the technical contents of the embodiments of the disclosure and help understanding of the embodiments of the disclosure, and are not intended to limit the scope of the embodiments of the disclosure. Therefore, the scope of various embodiments of the disclosure should be construed to include, in addition to the embodiments disclosed herein, all changes and modifications derived on the basis of the technical idea of the disclosure.

The invention claimed is:

1. A method performed by a terminal in a wireless communication system, the method comprising:
   receiving, from a base station connected with an evolved packet core (EPC) and a 5G core (5GC), a first system information block (SIB) including first barring information for the EPC;
   receiving, from the base station, a second SIB different from the first SIB, the second SIB including second barring information for the 5GC; and
   performing an access barring check based on one of the first barring information for the EPC and the second barring information for the 5GC, according to a core network to which the terminal is to connect.

2. The method of claim 1, further comprising:
   establishing a radio resource control (RRC) connection with the base station, according to a result of the access barring check.

3. The method of claim 1, wherein the first SIB is an SIB2 and
   the second SIB is an SIBx, and
   wherein the base station is connected with a mobility management entity (MME) of the EPC and an access and mobility management function (AMF) entity of the 5GC.

4. A terminal in a wireless communication system, the terminal comprising:
   a transceiver configured to transmit or receive a signal; and
   a controller configured to:
   receive, from a base station connected with an evolved packet core (EPC) and a 5G core (5GC), a first system information block (SIB) including first barring information for the EPC,
   receive, from the base station, a second SIB different from the first SIB, the second SIB including second barring information for the 5GC, and
   perform an access barring check based on one of the first barring information for the EPC and the second barring information for the 5GC, according to a core network to which the terminal is to connect.

5. The terminal of claim 4, wherein the controller is further configured to establish a radio resource control (RRC) connection with the base station, according to a result of the access barring check.

6. The terminal of claim 4, wherein the first SIB is an SIB2 and
   the second SIB is an SIBx, and
   wherein the base station is connected with a mobility management entity (MME) of the EPC and an access and mobility management function (AMF) entity for the 5GC.

* * * * *